US011216043B1

(12) United States Patent
Holung et al.

(10) Patent No.: US 11,216,043 B1
(45) Date of Patent: Jan. 4, 2022

(54) SYSTEM HINGE ASSEMBLY

(71) Applicant: Lenovo (Singapore) Pte. Ltd., Singapore (SG)

(72) Inventors: Joseph Anthony Holung, Wake Forest, NC (US); Bouziane Yebka, Apex, NC (US); Philip John Jakes, Durham, NC (US); Tin-Lup Wong, Chapel Hill, NC (US); Joseph David Plunkett, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/945,414

(22) Filed: Jul. 31, 2020

(51) Int. Cl.
*G06F 1/16* (2006.01)
*E05D 7/00* (2006.01)
*E05D 11/00* (2006.01)
*H02S 10/40* (2014.01)
*H02K 37/18* (2006.01)

(52) U.S. Cl.
CPC ............ *G06F 1/1681* (2013.01); *E05D 7/00* (2013.01); *E05D 11/00* (2013.01); *G06F 1/1616* (2013.01); *G06F 1/1643* (2013.01); *G06F 1/1656* (2013.01); *G06F 1/1684* (2013.01); *H02K 37/18* (2013.01); *H02S 10/40* (2014.12); *E05Y 2201/434* (2013.01); *E05Y 2201/46* (2013.01); *E05Y 2400/85* (2013.01); *E05Y 2400/86* (2013.01); *E05Y 2900/606* (2013.01)

(58) Field of Classification Search
CPC .... G06F 1/1681; G06F 1/1613; G06F 1/1615; G06F 1/1616; H01F 7/02; H01F 7/0231; H01F 7/0273; H01F 7/06
See application file for complete search history.

(56) References Cited

U.S. PATENT DOCUMENTS

| | | | | |
|---|---|---|---|---|
| 8,988,876 | B2* | 3/2015 | Corbin | G06F 1/1656 361/679.58 |
| 9,007,157 | B2* | 4/2015 | Ow | H01F 7/0263 335/306 |
| 2014/0273590 | A1* | 9/2014 | Sharma | G06F 1/1656 439/350 |
| 2014/0285960 | A1* | 9/2014 | Sharma | G06F 1/1683 361/679.28 |
| 2015/0378399 | A1* | 12/2015 | Grinstead | G06F 1/1632 361/679.09 |
| 2016/0239053 | A1* | 8/2016 | Kiple | G06F 1/1632 |
| 2020/0233459 | A1* | 7/2020 | Sanchez | G06F 1/1681 |
| 2020/0392759 | A1* | 12/2020 | Morrison | G06F 1/1681 |

* cited by examiner

*Primary Examiner* — Anthony Q Edwards
(74) *Attorney, Agent, or Firm* — Brian J. Pangrle

(57) ABSTRACT

A system can include a housing; a hinge assembly operatively coupled to the housing for rotation of the housing about a hinge axis, where the hinge assembly includes permanent magnets that generate a first magnetic field and a second magnetic field orientable with respect to each other via rotation of the housing, where the first magnetic field and the second magnetic field include an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation; and an electromagnetic mover operatively coupled to the housing for rotation of the housing about the hinge axis.

20 Claims, 29 Drawing Sheets

Method 2610

Stabilizing a Display Housing with respect to a Keyboard Housing of an Information Handling System (IHS)
2612

↓

Responsive to a Signal, Rotate the Display Housing with respect to the Keyboard Housing
2614

SYSTEM HINGE ASSEMBLY

TECHNICAL FIELD

Subject matter disclosed herein generally relates to technology for computing systems or other systems.

BACKGROUND

Various types of devices, systems, display systems, computing and display systems, etc. exist where, for example, a hinge assembly allows for orienting one portion with respect to another portion. For example, a display portion may be oriented with respect to a keyboard portion of a system.

SUMMARY

A system can include a housing; a hinge assembly operatively coupled to the housing for rotation of the housing about a hinge axis, where the hinge assembly includes permanent magnets that generate a first magnetic field and a second magnetic field orientable with respect to each other via rotation of the housing, where the first magnetic field and the second magnetic field include an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation; and an electromagnetic mover operatively coupled to the housing for rotation of the housing about the hinge axis. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
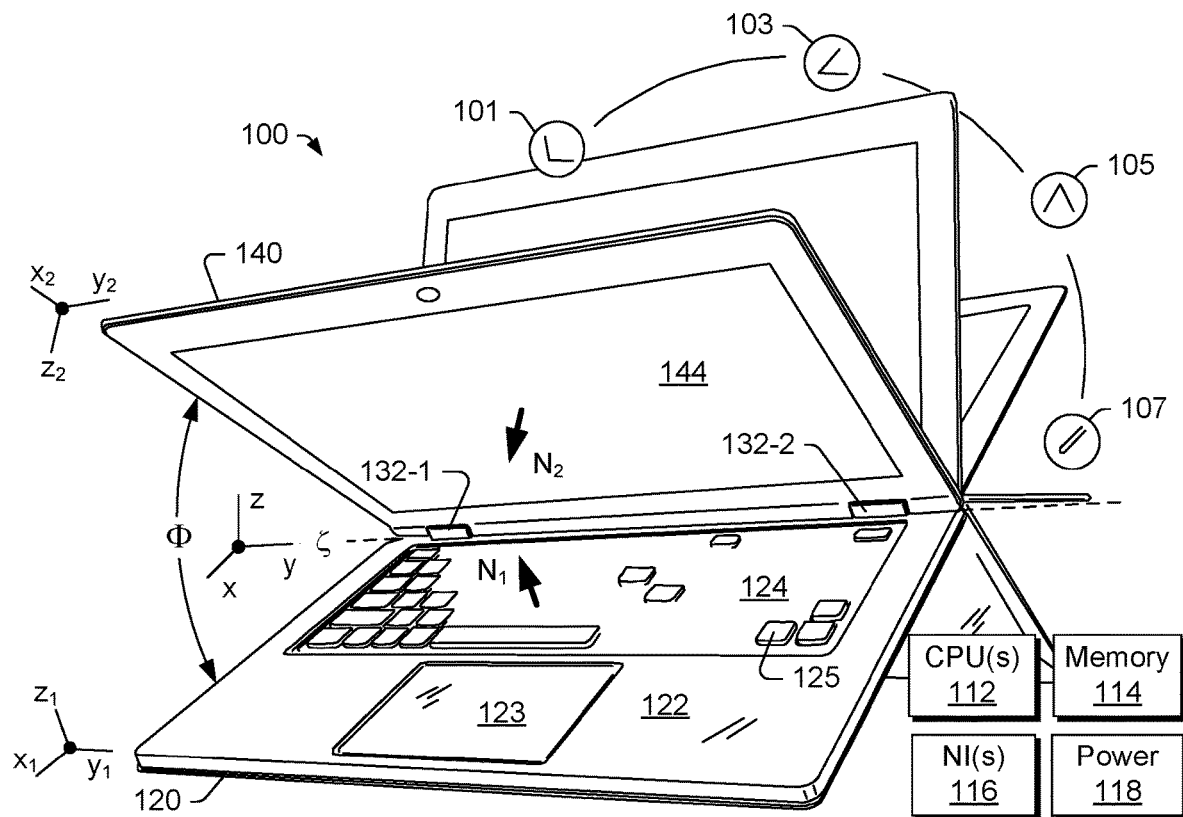
FIG. 1 is a diagram of an example of a system.
Figure 1:
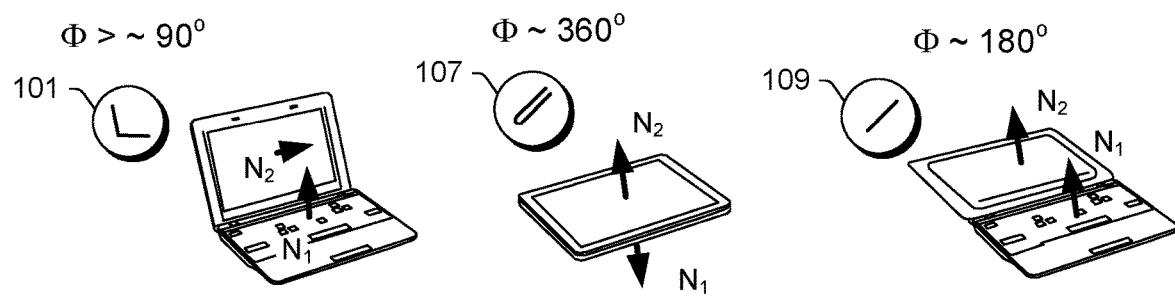

FIG. 1 shows an example of a system 100 that includes a keyboard housing 120 and a display housing 140 that are rotatable with respect to each other via movement about one or more hinges assemblies 132-1 and 132-2. The system 100 may be a device such as, for example, a computing device (e.g., an information handling device).

As an example, the system 100 may include one or more processors 112, memory 114 (e.g., one or more memory devices), one or more network interfaces 116, and one or more power cells 118 (e.g., one or more lithium-ion rechargeable batteries, etc.). Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along a y-axis ($y_1$), a length along an x-axis ($x_1$) and a height along a z-axis ($z_1$) that extends in a direction outwardly away from touch surfaces of keys 125 of the keyboard 124 and the display 144 is defined in a second Cartesian coordinate system as having a width along an y-axis ($y_2$), a length along an x-axis ($x_2$) and a height along a z-axis ($z_2$) that extends in a direction outwardly away from a viewing surface of the display 144. As an example, a coordinate system may be right-handed or left-handed.

As shown in the example of FIG. 1, the one or more hinge assemblies 132-1 and 132-2 rotatably connect the keyboard housing 120 and the display housing 140 for orienting the display housing 140 with respect to the keyboard housing 120. For example, orientations may include orientations definable with respect to an axis (e.g., or axes) such as the axis ζ and an angle θ about that axis. In the example of FIG. 1, another Cartesian coordinate system is shown, with a y-axis that can be parallel to the axis ζ where the z-axis may be directed upwardly, opposite gravity where an x-axis and the y-axis can define a plane where the z-axis is normal to the x,y-plane. As an example, the system 100 can be positioned on a horizontal surface such as a desk surface (e.g., a desktop), a table surface, a countertop surface, etc., where the horizontal surface is parallel to the x,y-plane and where gravity is normal to the horizontal surface in a downwardly directed direction (e.g., acceleration due to gravity, G, is in a direction toward the ground). In various instances, the system 100 may be positioned on a surface or surfaces that are not horizontal (e.g., legs, a tilted desktop, etc.).

The system 100 can be defined by a mass, which can include a mass of the keyboard housing 120 and a mass of the display housing 140, which may be the same or may differ. For example, the mass of the keyboard housing 120 may exceed the mass of the display housing 140. In such an example, the keyboard housing 120 may help to stabilize the system 100 when positioned on a surface such as a horizontal surface. For example, consider the keyboard housing 120 as having a mass that exceeds a mass of the display housing 140 and where the keyboard housing 120 helps to stabilize the system 100 on a horizontal surface for angles Φ that exceeds approximately 90 degrees. In such an example, the mass difference may help to keep the system 100 from tipping backwards as the mass of the display housing 140 can generate a moment, which may be defined, for example, as a moment of force acting on an object (e.g., a torque), which may be the product of a force and a distance with respect to a reference point.

A force applied perpendicularly to a lever multiplied by its distance from a fulcrum of the lever (e.g., a length of the lever arm) can define the torque of the lever about the fulcrum. For example, a force of three newtons applied two meters from a fulcrum may exert the same torque as a force of one newton applied six meters from the fulcrum. As to a convention, the direction of torque may be determined by using a right hand grip rule where, if the fingers of the right hand are curled from the direction of the lever arm to the direction of the force, then the thumb points in the direction of the torque. For such a convention, when the angle Φ is greater than approximately 90 degrees, for a force equal to mg (e.g., F=mg) acting at a lever arm length of L, the torque points in the −y direction; whereas, when the angle Φ is less than approximately 90 degrees, the torque for the same force points in the +y direction; and, when the angle Φ is approximately 90 degrees, the torque is approximately zero.

Various clamshell types of systems that include one or more hinge assemblies may include one or more friction elements that impart friction that overcomes gravitational force and associated torque. Such a friction element approach can help to maintain a desired angle Φ, which may be, for example, a viewing angle such as an ergonomic viewing angle for a display by a user of a clamshell system, where the viewing angle can be defined between a keyboard housing and a display housing that includes the display. Such a friction element approach may provide for additional amount of friction such that vibration or some amount of shock does not cause a change in the viewing angle. For example, consider vibration from touch typing or consider a user on a plane, a train, in a car, etc., where a rough road, a curb, etc., may cause some amount of shock that does not overcome friction generated by one or more friction elements.

As to a shock, consider a downward movement of an object coupled to a hinge as a fulcrum that is abruptly halted. In such an example, the object may gain momentum such that the abrupt halt causes the object to overcome friction of the hinge and rotate about the hinge, which can be undesirable to a user.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is approximately 180 degrees such that a normal outward vector $N_1$ of the keyboard 124 of the keyboard housing 120 and a normal outward vector $N_2$ of the display 144 of the display housing 140 are oriented in approximately the same pointing directions.

In the example of FIG. 1, one or more of the hinge assemblies 132-1 and 132-2 can include permanent magnets, which can be or include radially magnetized permanent magnets. In such an approach, the magnetic fields of the permanent magnets can generate torque, which may be analyzed in a static sense or a dynamic sense.

As to a static sense, consider torque that is generated to counter at least a portion of torque generated by the acceleration of gravity acting on an object with a mass where the object is rotatably coupled to another object. For example, consider the orientation 101 where torque is generated to counter torque generated by the acceleration of gravity acting on the display housing 140 such that angle Φ remains fixed, optionally without friction at a hinge assembly (e.g., consider a substantially frictionless hinge assembly or relatively low friction hinge assembly).

As an example, a system can include a first housing that includes a processor and memory accessible to the processor; a second housing that includes a display operatively coupled to the processor; and a hinge assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counter-clockwise restoring torque responsive to rotation in a second, opposite rotational direction from the aligned orientation.

Figure 2:
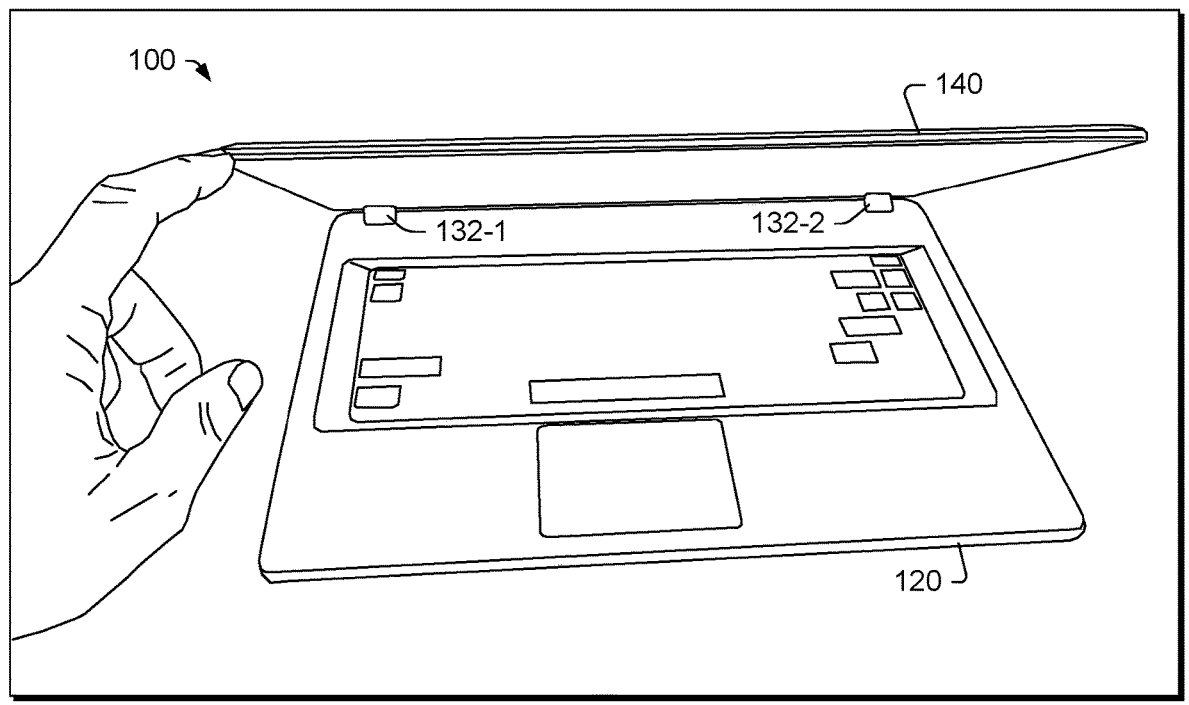
FIG. 2 is a perspective view of the system of FIG. 1.

FIG. 2 shows a perspective view of the system 100, which may be an apparatus (e.g., a device), where one or more of the hinge assemblies 132-1 and 132-2 include permanent magnets that generate torque that can be a restoring torque that counteracts a torque due to the acceleration of gravity acting upon the display housing 140. In such an example, the angle Φ may be adjustable by a user through use of minimal force. For example, a light touch from a tip of a finger of a user's hand may adjust the angle Φ where, once adjusted, the angle Φ does not change as torques, in opposing directions, can effectively cancel. The system 100 in the example of FIG. 2 may be referred to as a feather touch system in that touch to adjust a housing angle may be quite light.

As an example, a force demand may depend on overcoming a small amount of friction between components without involving a mass lifting force as may be associated with moving a center of mass of an object in a direction that is opposite that of the direction of the acceleration of gravity as such a mass lifting force may be counteracted by a permanent magnet hinge assembly (e.g., or assemblies).

Work can be defined as a product of weight (e.g., mg) and distance. If a display housing has a weight of 2 N (e.g., 0.204 kg multiplied by 9.8 m/s$^2$) and a center of mass that is 0.1 m from a rotational axis (e.g., maximum torque of 0.2 N-m or 20.4 kgf-mm), a rotation of the display housing about the rotational axis by an angular increment that increases the vertical height of the center of mass by 0.02 m against gravity would demand work of approximately 0.04 J. However, if the gravity torque is offset by a magnetic torque (e.g., a restoring torque), then the net torque can be zero and the amount of work performed by a user's hand can be approximately zero.

As to dynamics, a relatively slow adjustment to the angle Φ may be relatively free of velocity related effects such that a user does not experience resistance cause by velocity related magnetic field interactions. As an example, where velocity (change in position in a direction with respect to time) increases, some amount of force may be generated via velocity related magnetic field interactions, which may act to somewhat resist the direction of movement.

In the example of FIG. 2, the mass of the display housing 140 may be reduced when compared to a system that does not include one or more permanent magnet hinge assemblies that can supply a restoring torque. For example, in a system with a friction hinge assembly without permanent magnets, a display housing may be designed with a sufficient amount of structural rigidity to account for a user pushing or pulling on an upper corner of the display housing to open or close the system. As a display may be a relatively fragile component (e.g., akin to a thin plate of glass), the display housing can help to assure that the display does not twist in a manner that could lead to cracking or other damage (e.g., to liquid crystal structures, LED structures, etc.). Where a system includes a permanent magnet hinge assembly that supplies a restoring torque, adjustment of a display housing may be accomplished with little applied force, as illustrated in FIG. 2. As such, the risk of twisting the display housing may be reduced and, hence, fewer, lighter, etc., components may be utilized in constructing the display housing. Such a display housing may be lighter, thinner, etc., which, in turn, may demand lesser strength permanent magnets to generate a restoring force that offsets at least a portion of a gravity force (e.g., F=mg) of the display housing (e.g., a gravity related torque). Further, as the mass of a display housing decreases, the mass of a keyboard housing can decrease as well as the mass to avoid tipping over for angles Φ greater than 90 degrees diminishes. As another example, a system with a magnetic restoring torque hinge assembly may be made with a larger display (e.g., a larger footprint) that would otherwise be at risk of twisting damage when utilized with a friction hinge assembly that does not include permanent magnets that provide a restoring torque.

Referring again to the illustration of FIG. 2, a user may open a laptop computer using one or more fingers, for example, by applying a pinching force at an upper corner of a display housing between a forefinger and thumb while applying a directional force to rotate the display housing by overcoming frictional force at one or more friction hinges. In such an example, the display housing may twist such that the upper corner moves backwards in a plane, which can place a display at risk of damage. In contrast, as shown in FIG. 2, where one or more permanent magnet hinge assemblies are utilized to supply a restoring torque, a single fingertip may be utilized, which may be positioned in a manner such that a fingerprint is not left on a display of a display housing (e.g., consider a "frameless" display that extends to borders of a display housing). In such an example, ergonomics are improved, user experience is improved and, for example, depending on extent of a display, a risk of leaving a fingerprint on the display can be reduced.

Figure 3A:
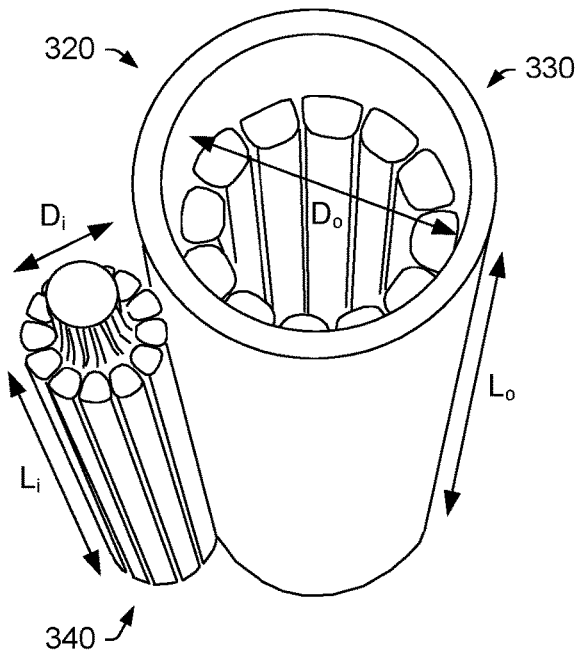
FIG. 3A, FIG. 3B and FIG. 3C are a series of diagrams of an example of a hinge assembly.
Figure 3C:
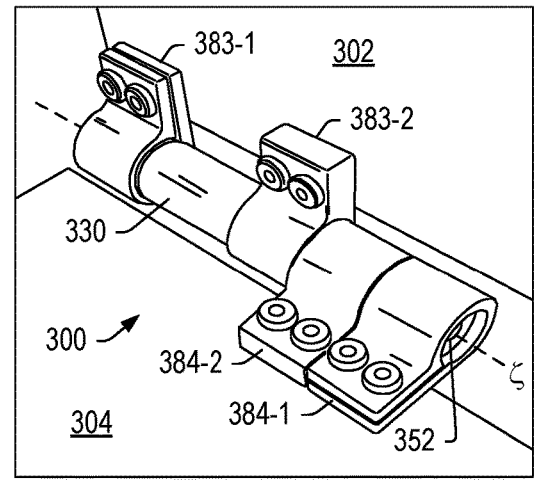
Figure 3B:
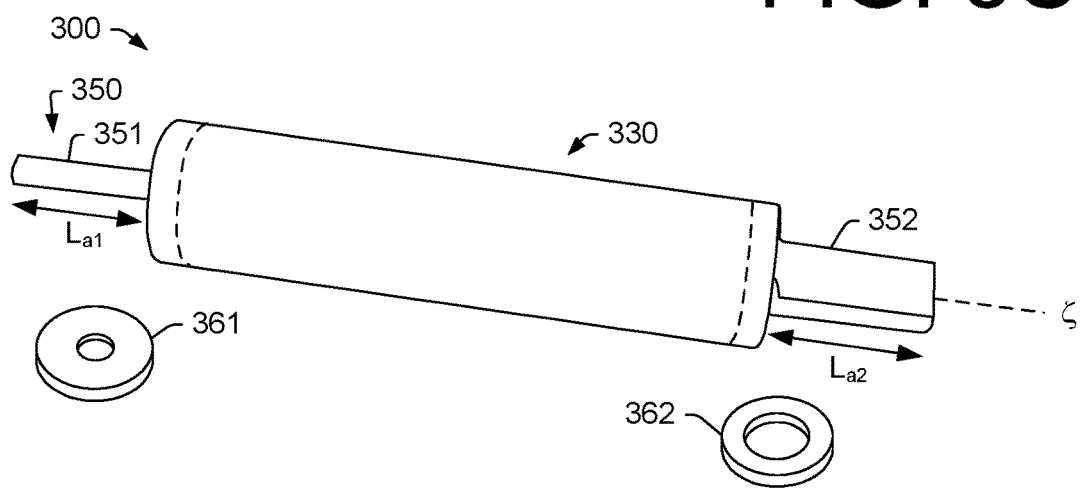

FIG. 3A and FIG. 3B show perspective views of examples of permanent magnets 320 and 340 that can be arranged to form an example hinge assembly 300, which can be a permanent magnet hinge assembly that supplies a restoring torque. As shown, the permanent magnets 320 and 340 are radially arranged where an axle 350 can support permanent magnetic material and where a casing 330 can support permanent magnetic material.

As shown, the permanent magnets 320 and 340 can be concentrically arranged along a common rotational axis where a first portion of the axle 350 is supported by a first bushing or bearing 361 and where a second portion of the axle 350 is supported by a second bushing or bearing 362. The bushings or bearings 361 and 362 may be of a common size and of common specifications or they may differ. As an example, one or more of the bushings or bearings 361 and 362 may be relatively frictionless (e.g., relatively low friction) such that friction force is small compared to forces generated by rotation of the permanent magnets 320 and 340 with respect to each other about the common rotational axis, which can be defined by an angle such as an angle α. For example, the angle α may be equal to zero when magnetic fields of the permanent magnets 320 and 340 are aligned. In such an example, consider the casing 330 supporting magnetic material that forms the permanent magnet 320 (e.g., or magnets) with a single north pole and a single south pole and the axle 350 supporting magnetic material that forms the permanent magnet 340 (e.g., or magnets) with a single north pole and a single south pole where the south pole of the permanent magnet 340 is aligned with the north pole of the permanent magnet 320. In such an alignment, the permanent magnets 320 and 340 can be defined to be in a stable steady state; whereas, if the south pole of the permanent magnet 340 is aligned with the south pole of the permanent magnet 320, the permanent magnets 320 and 340 can be defined to be in an unstable steady state. In an unstable steady state, a rotational perturbation can cause the alignment to transition from the unstable steady state to the stable steady state.

In the example of FIG. 3A and FIG. 3B, various dimensions are shown, which include a length $L_i$ and a diameter $D_i$ of the permanent magnet 340 and a length $L_o$ and a diameter $D_o$ of the permanent magnet 320. Further, the axle 350 is shown as including a first portion 351 with a length $L_{a1}$ and a second portion 352 with a length $L_{a2}$. The first portion 351 may be received via a bore in the first bushing or bearing 361 and rotatably supported therein in and the second portion 352 may be received via a bore in the second bushing or bearing 362 and rotatably supported therein. As shown in FIG. 3A and FIG. 3B, the length $L_i$ can be greater than $D_i$ and the length $L_o$ can be greater than $D_o$.

FIG. 3C shows the hinge assembly 300 operatively coupled to a first housing 302 and a second housing 304 via fittings 383-1, 383-2, 384-1 and 384-2. As shown, the fittings 383-1 and 383-2 can secure the casing 330 to the first housing 302 and the fittings 384-1 and 384-2 can secure the axle 350 to the second housing 304. In the example of FIG. 3C, the first portion 351 of the axle 350 may be shorter axially than the second portion 352 of the axle 350, where the second portion 352 is sufficiently long to provide a surface to be secured via one or more fittings such as the one or more fittings 384-1 and 384-2. As shown, a fitting may be a fix fitting, a guide fitting or a fitting may be an adjustable fitting. A guide fitting (see, e.g., the fittings 383-2 and 384-2) may guide a component along an axis while an adjustable fitting may allow for clamping a component and unclamping a component where, in an unclamped state, the component is translatable axially and/or rotatable azimuthally. For example, an assembly process may orient the housings 302 and 304 according to an angle (e.g., Φ=90 degrees or α=0 degrees, etc.) where the casing 330 and the axle 350 are fixed and/or clamped (e.g., via the fittings 383-1 and 384-1, respectively) such that the permanent magnets 320 and 340 are in a stable steady state.

Given definitions of a stable steady state and an unstable steady state, an intermediate state can be defined as corresponding to an orientation that is not that of the stable steady state and not that of the unstable steady state. In an intermediate state, there can be torque, which may be in one of two directions (e.g., acting clockwise or acting counterclockwise). For example, if the stable steady state is at an angle α equal to zero degrees and the unstable steady state is at an angle α equal to 180 degrees, then an intermediate state is an angle α that is not equal to zero degrees and not equal to 180 degrees.

Figure 4A:
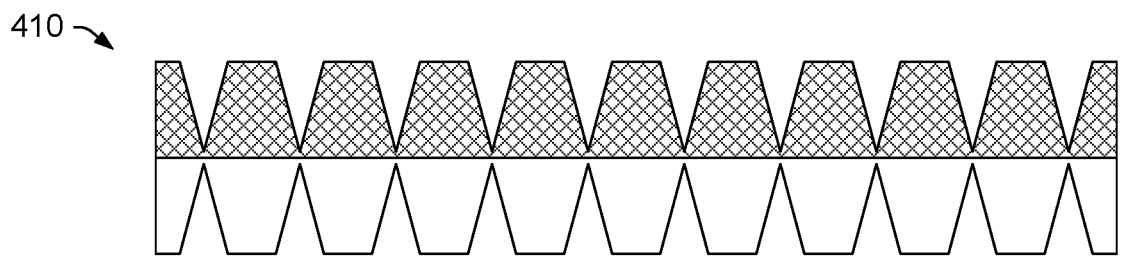
FIG. 4A and FIG. 4B are a series of diagrams of examples of one or more magnets.
Figure 4B:
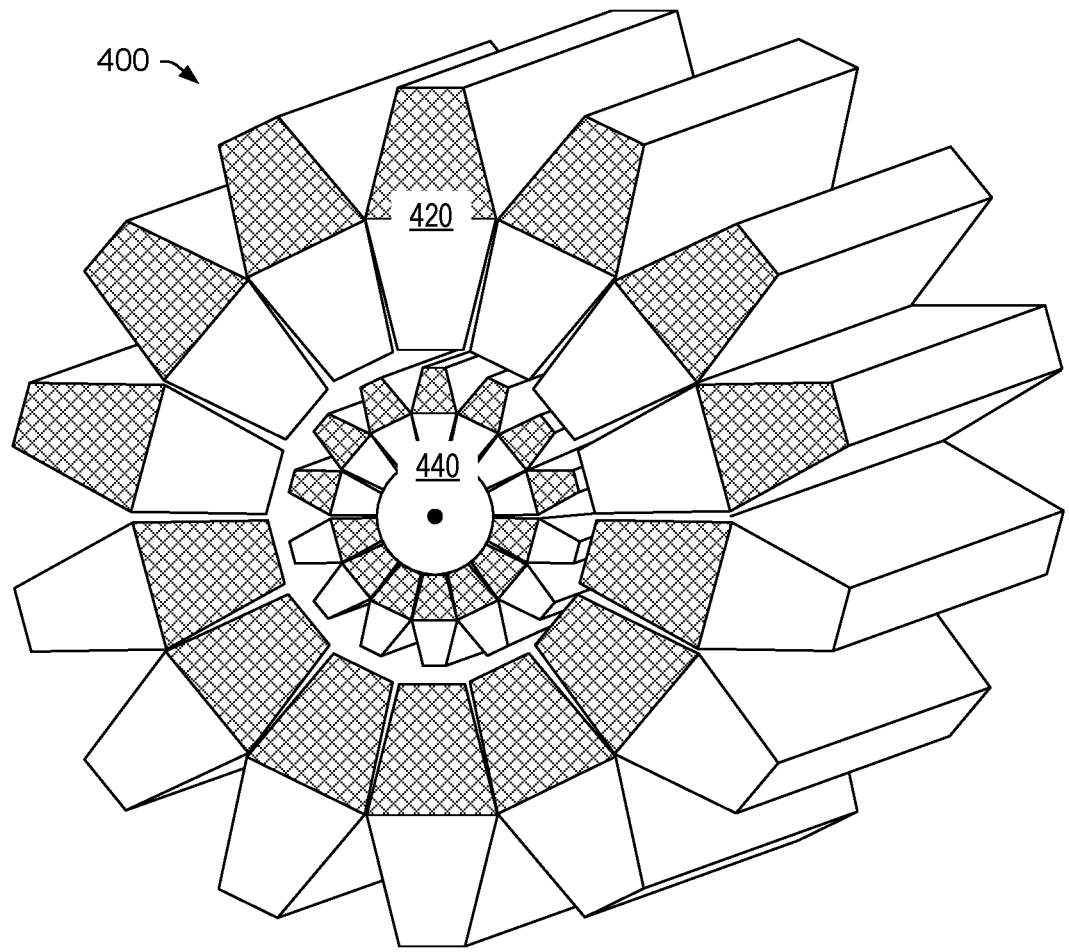

FIG. 4A and FIG. 4B show examples of a permanent magnet or permanent magnets 410, which may be magnetic material or magnetic materials that can form a stator 420 and rotor 440 arrangement 400. As shown, the arrangement 400 is in a stable steady state orientation as poles are aligned. In such an example, a rotation of the rotor 440 in a clockwise direction toward the unstable steady state orientation will generate torque on the rotor 440 in a counterclockwise direction. In such an example, the generated torque can be defined as a restoring torque that acts to restore the rotor 440 to the stable steady state orientation.

As to the permanent magnet or permanent magnets 410, consider a formed plate with appropriate cutouts that allow for formation of a radial arrangement or consider a series of elements that allow for formation of a radial arrangement. As shown, the permanent magnet or permanent magnets 410 may be formed into an arrangement with an inward north pole and outward south pole or with an inward south pole and an outward north pole.

As an example, one or more permanent magnets may be formed from material that can be magnetized (e.g., ferromagnetic material, etc.). For example, consider shaping material into a desired shape for a permanent magnet hinge assembly and then magnetizing the shaped material. As an example, a direct, an indirect or a direct and indirect approach may be utilized to form a permanent magnet.

As to a direct approach, as an example, current can be passed directly through material. Such an approach may involve clamping the material between two electrical contacts where current is passed through the material and a circular magnetic field is established in and around the material. When the magnetizing current is stopped, a residual magnetic field can remain within the material where the strength of the induced magnetic field can be proportional to the amount of current passed through the material.

As to an indirect approach, a strong external magnetic field may be utilized to establish a magnetic field within the material. Such an approach may utilize one or more of a permanent magnet, an electromagnet, a coil, a solenoid, etc. For example, consider a material that is placed longitudinally in a concentrated magnetic field that fills a center of a coil or solenoid.

Figure 5A:
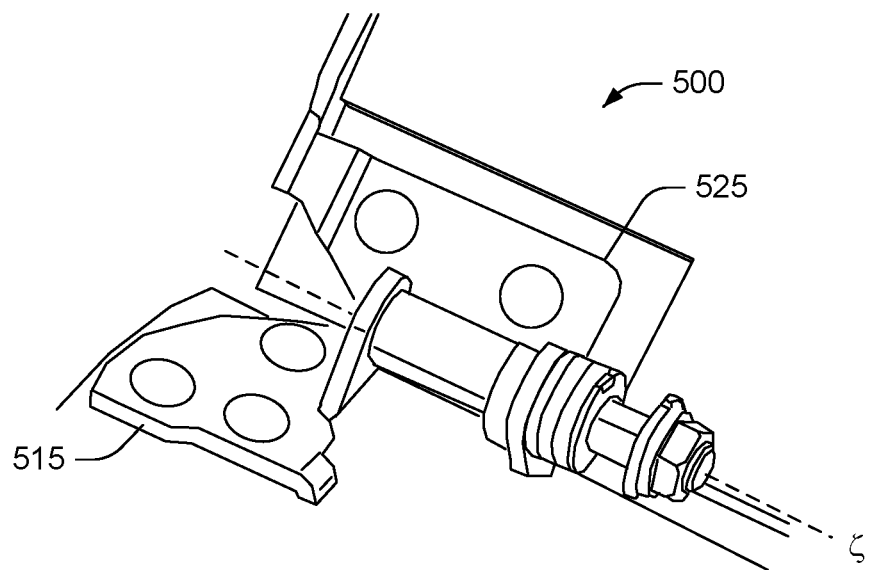
FIG. 5A and FIG. 5B are a series of diagrams of an example of a hinge assembly.
Figure 5B:
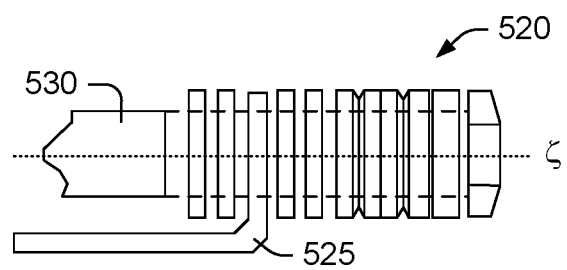

FIG. 5A and FIG. 5B show an example of a hinge assembly 500 that includes a saddle 515 and a saddle 525 with respect to a hinge post 530 and various components 520. The components 520 may include a screw nut, a dowel plate, disk type leaf springs, packing, etc. As an example, the hinge assembly 500 may include one or more friction elements to form a friction hinge assembly. As an example, the hinge assembly 500 may include permanent magnets such as the permanent magnets of FIG. 3A and FIG. 3B, FIG. 4A and FIG. 4B, etc. In such an approach, a desired amount of friction may be introduced, which may be for ergonomic purposes, for example, to provide a user with a particular amount of resistance to movement of a housing with respect to another housing; noting that the friction introduced can be substantially less than a friction required to counteract a lever arm under the acceleration of gravity. In such an approach, an amount of friction may be a "feel" friction for ergonomic reasons rather than a holding friction for static reasons. As an example, a system can include one or more permanent magnet hinge assemblies and one or more friction hinge assemblies or one or more hybrid hinge assemblies (e.g., permanent magnets with one or more friction elements).

Figure 6A:
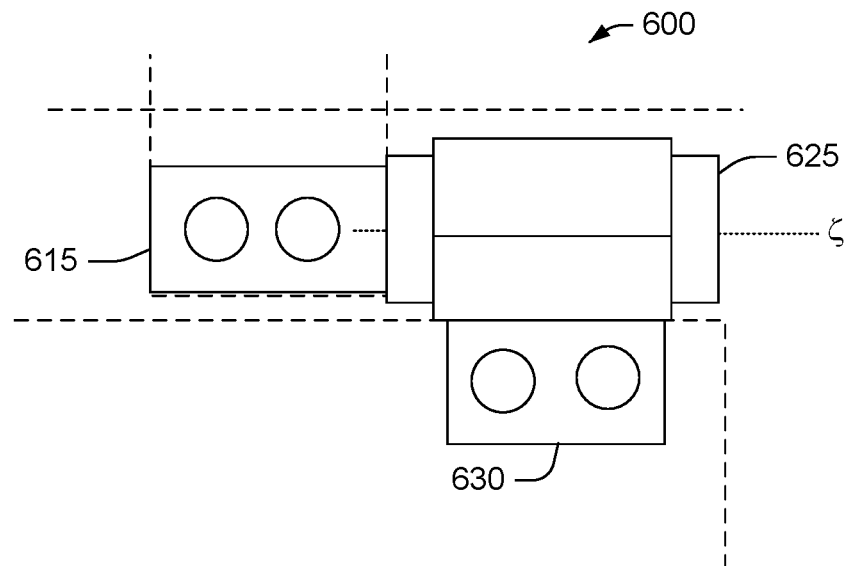
FIG. 6A and FIG. 6B are a series of diagrams of an example of a hinge assembly.
Figure 6B:
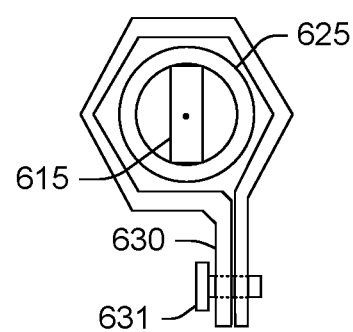

FIG. 6A and FIG. 6B show an example of a hinge assembly 600 that includes a hinge post 625 along with connector portions 615 and 630, where dashed lines indicate some example housings or housing couplings. In the example hinge assembly 600, permanent magnets may be included along with one or more friction elements. The hinge assembly 600 may be a permanent magnet hinge assembly, a friction hinge assembly or a hybrid hinge assembly. As shown in the example of FIG. 6A and FIG. 6B, one or more bolts 631 and/or one or more other types of components may be utilized to secure a connector portion and a housing, a base, etc., such that a hinge assembly can rotatably couple a housing to another housing, to a base, etc.

As an example, a component may provide for adjustment of a portion of a hinge assembly, for example, consider clamping where a clamping force may be adjusted.

In various examples, a hinge assembly can include a connector portion that is a leaf (e.g., a hinge leaf), which can rotate a number of degrees around an axle (e.g., a pin) and may be an extension of a knuckle (e.g., integral, attached, etc.), where a knuckle can form a hollow part at a joint of a hinge (e.g., a hinge bore) in which an axle (e.g., a pin) is received. As an example, the saddle 515 can be a leaf, the saddle 525 can be a leaf, the connector portion 615 can be a leaf, and/or the connector portion 630 can be a leaf.

As explained, a hinge assembly can be a friction hinge assembly where one or more components can provide for adjustment of friction force. In the example of FIGS. 5A and 5B, various components may be disposed about a portion of an axle and adjustably tightened or loosened to adjust friction force. In the example of FIG. 6A and FIG. 6B, the connector portion 630 may be configured as a clamp such as a wrap strap where a single piece of material is shaped with a bore portion and tab ends where the tab ends can be brought close together to reduce a diameter of the bore portion. In such an example, each of the tab ends can include an opening through which a bolt or another type of component is passed that can be utilized to secure the connector portion 630 to a housing (e.g., or a base, etc.) and/or to adjust friction force.

As explained, a system can include a magnetic hinge assembly and may include another type of hinge assembly. For example, consider a left side magnetic hinge assembly and a right side guide hinge assembly, which may be relatively frictionless (e.g., low friction) or of an adjustable or fixed friction. As another example, consider a right side magnetic hinge assembly and a left side guide hinge assembly, which may be relatively frictionless (e.g., low friction) or of an adjustable or fixed friction. In such examples, a guide hinge assembly may be provided to help guide rotation of a housing. As yet another example, consider a magnetic hinge assembly disposed between two guide hinge assemblies (e.g., left and right guide hinge assemblies). In such an example, the magnetic hinge assembly may provide a restoring torque while the guide hinge assemblies provide for alignment (e.g., along an axis). In such an example, the magnetic hinge assembly may be contactless where an axle (e.g., a shaft) is rotatably supported by both of the guide hinge assemblies. In such an approach, the support provided by the bushings or bearings 361 and 362 with respect to the casing 330 and the axle 350 in the example of FIG. 3B may be provided by the guide hinge assemblies.

Figure 7:
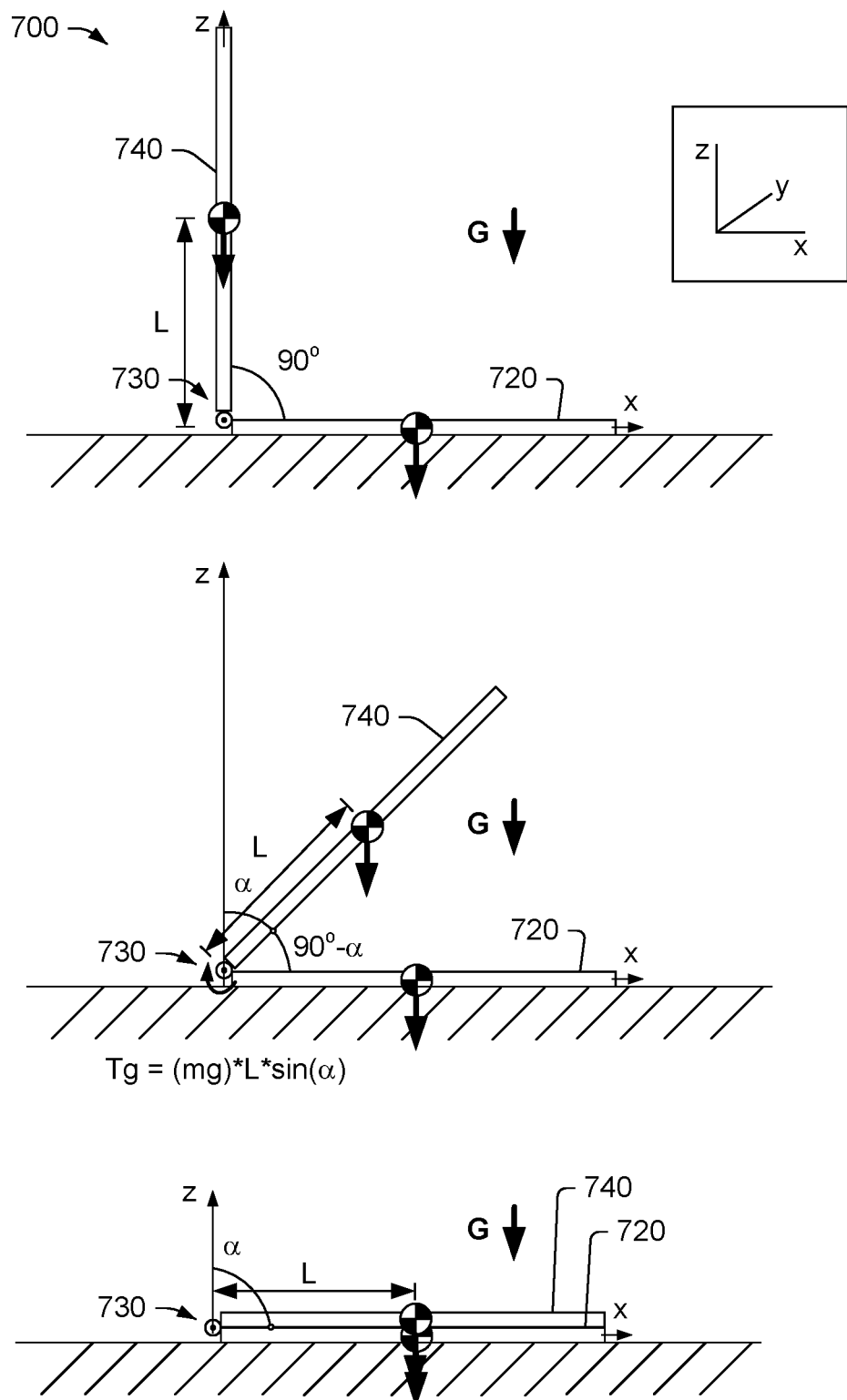
FIG. 7 is a series of diagrams of an example of a system and an example of a method for transitioning the system.

FIG. 7 shows an example of a system 700 that includes housings 720 and 740 rotatably coupled via a hinge assembly 730. In the example of FIG. 7, center of mass (e.g., which may correspond to a center of gravity of a housing) symbols are shown where, for the housing 740, a length L is shown as a lever arm length. In FIG. 7, an equation is given for gravity related torque Tg as follows:

$$Tg = (mg)*L*\sin(\alpha)$$

In the foregoing equation, m is the mass of the housing 740 and α is an angle measured from vertical, where the housing 720 is supported on a horizontal surface. As shown, in the top orientation, torque is zero as the angle α is 0 degrees such that the lever arm is aligned with gravity; whereas, in the bottom orientation, torque is at a maximum as the housing 740 is horizontal and substantially parallel with the housing 720, which may correspond to the angle α being approximately 90 degrees. In the middle orientation, the angle α is between 0 and 90 degrees such that the term sin(α) is neither zero nor unity where torque due to gravity can be approximated by the foregoing equation.

As an example, in a closed orientation (bottom orientation in FIG. 7), one or more magnets may be utilized to help maintain the system 700 in the closed orientation. For example, consider a magnet in the housing 720 and a ferromagnetic material in the housing 740 that align in the closed orientation such that a magnetic attraction force is established, which may help avoid undesirable opening of the housings (e.g., during transport, etc.). Such a magnetic attraction force may be relatively small and overcome by manual force such as, for example, a force applied by a fingertip to lift the housing 740 away from the housing 720. Once the housing 740 is rotated a small distance away from the housing 720 (e.g., an arc distance corresponding to a few degrees of rotation such as, for example, 3 to 5 degrees Φ), the magnetic attraction force can be sufficiently weak and negligible. When a user wants to transition the system to the closed orientation, the user can move the housing 740 toward the housing 720 where, at the relatively small distance, the magnetic attraction force can "take over" and transition the system to the closed orientation, which may be considered a closed and secured orientation. As an example, a "snap" action or a more viscous, damped action may occur for angles of Φ less than approximately 10 degrees. Such an action may occur at an angle that is deemed to be an indicator angle that a user wants to transition the system to a closed orientation rather than merely an out-of-view angle of a display (e.g., such that others do not see screen content). As an example, a magnetic attraction force may commence at an angle that corresponds to a trigger angle of a system for transitioning a system to a lower power state (e.g., a sleep state, a shutdown state, etc.). In such an example, a greater angle may indicate that a user merely wants to hide a display from view without necessarily making a power state transition.

Figure 8:
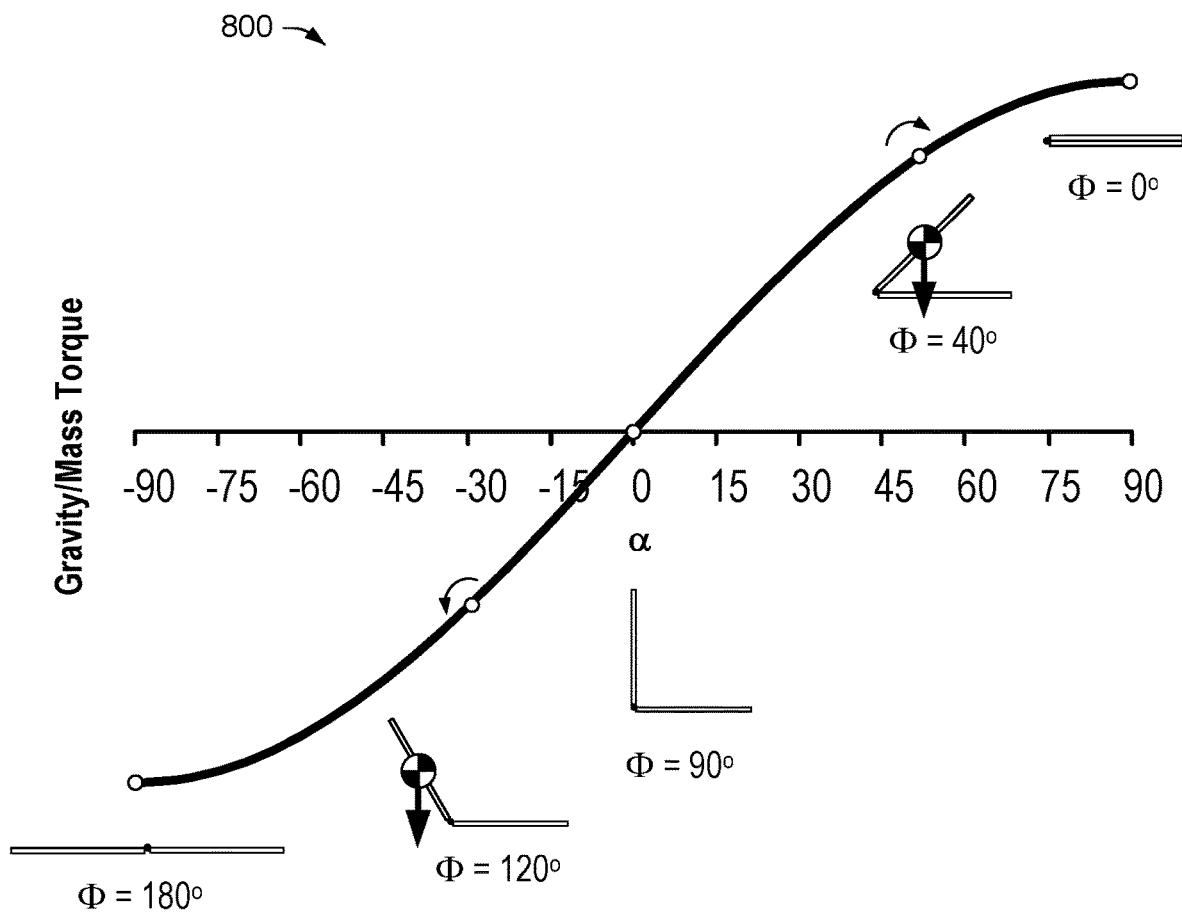
FIG. 8 is a diagram of an example plot.

FIG. 8 shows an example plot 800 of gravity or mass torque versus angle α over a range from −90 degrees to +90 degrees. Example system graphics are also illustrated showing values of an angle Φ where one of the two housings remains horizontal. In the example of FIG. 8, the plot 800 shows torque that is sinusoidal in shape with respect to angle. For example, the torque may be represented using a sine function, as mentioned with respect to FIG. 7.

Figure 9:
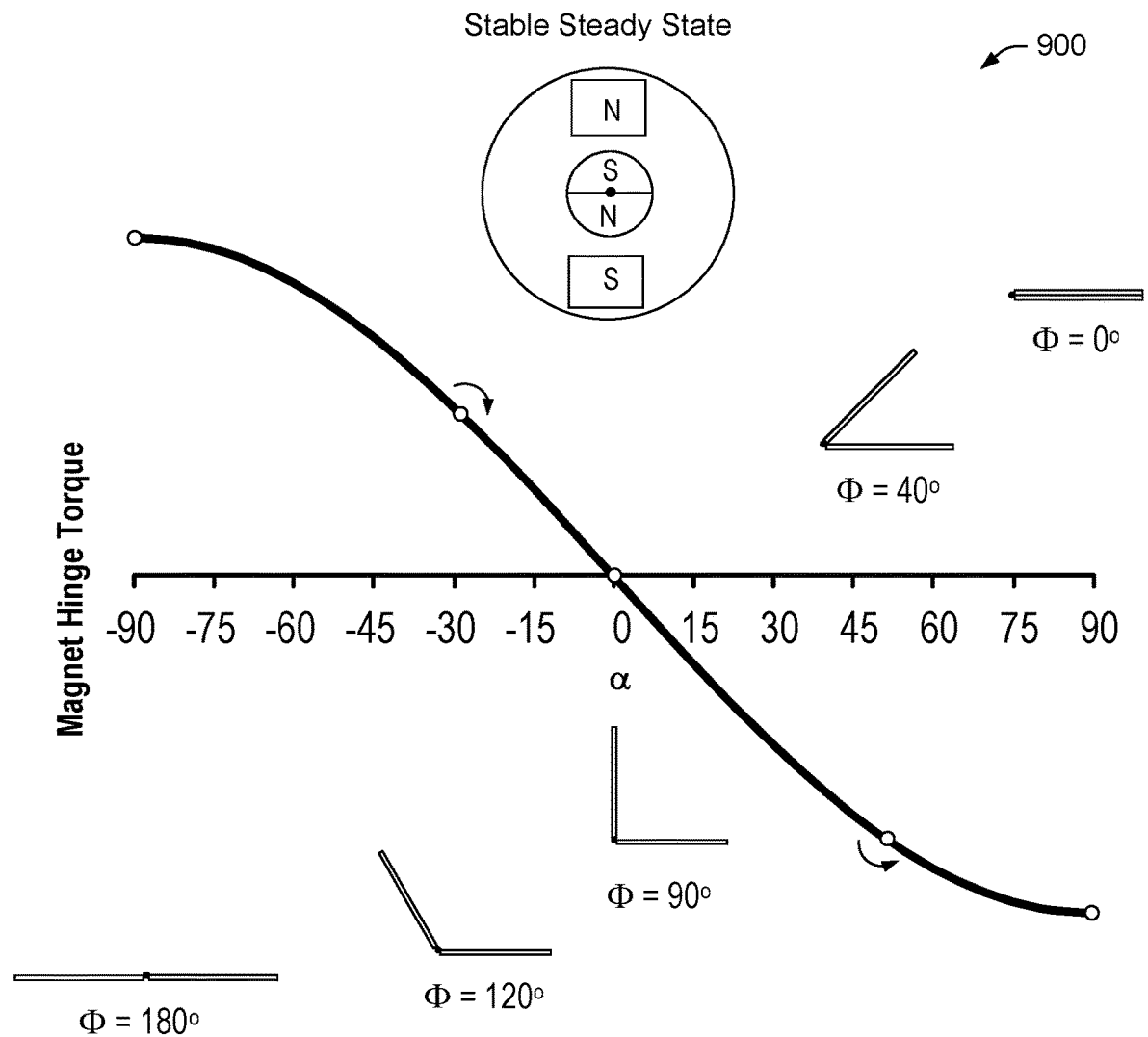
FIG. 9 is a diagram of an example plot.

FIG. 9 shows an example plot 900 of magnetic torque versus angle α over a range from −90 degrees to +90 degrees. As indicated, 0 degrees corresponds to a stable steady state. Example system graphics are also illustrated showing values of an angle Φ where one of the two housings remains horizontal. In the example of FIG. 9, the plot 900 shows torque that is sinusoidal in shape with respect to angle. For example, the torque may be represented using a sine function where a restoring torque is clockwise over a range of angles and where a restoring torque is counterclockwise over a range of angles.

Figure 10:
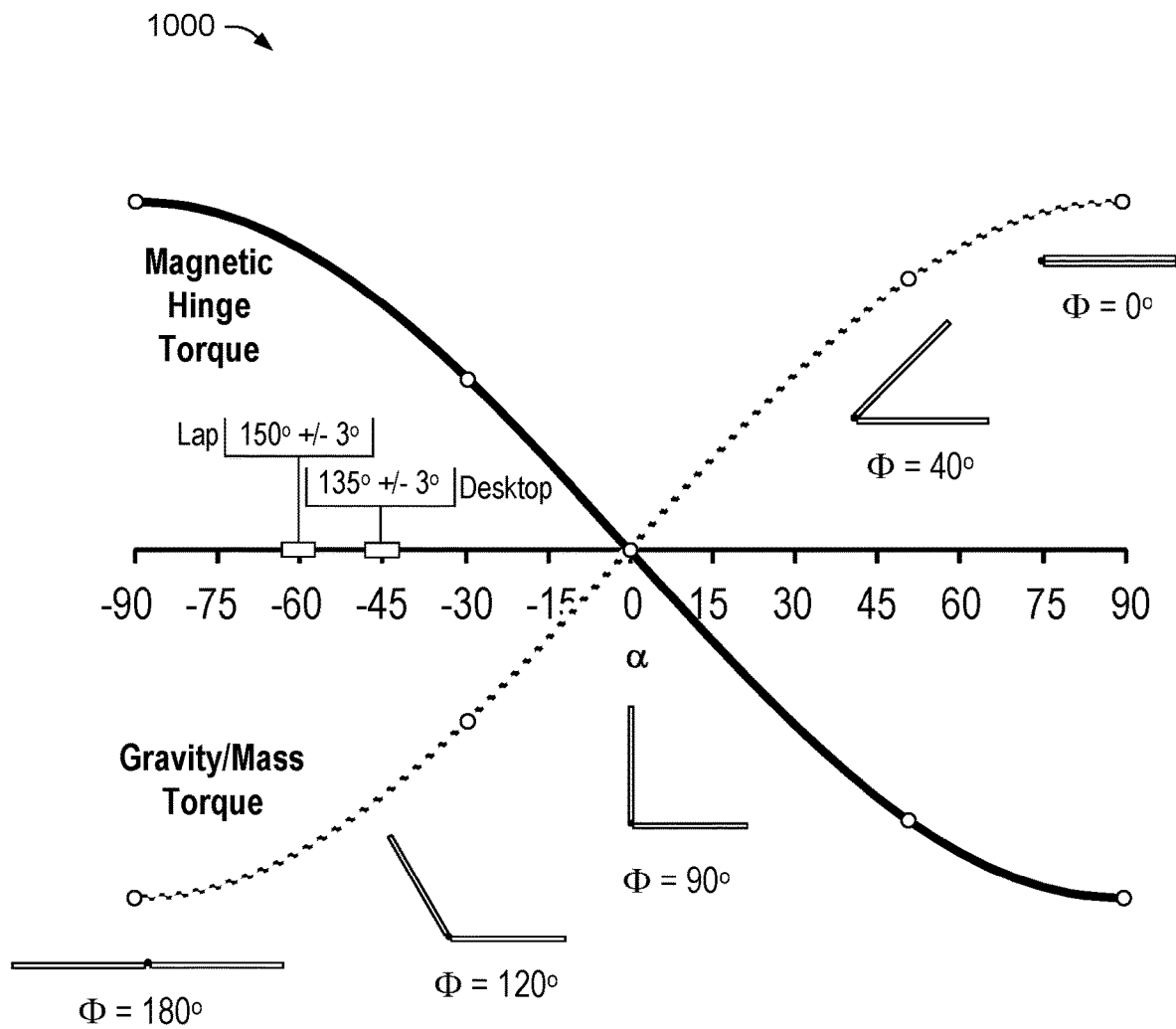
FIG. 10 is a diagram of an example plot.

FIG. 10 shows an example plot 1000 of magnetic torque and gravity or mass torque versus angle α over a range from −90 degrees to +90 degrees. As indicated, α equal to 0 degrees corresponds to a stable steady state. As shown, the torques can, at least theoretically, cancel. Example system graphics are also illustrated showing values of an angle Φ where one of the two housings remains horizontal. As explained with respect to FIG. 2, in such an approach, a user may adjust an angle between housings (e.g., the angle Φ) using an extremely light touch.

As an example, a system may include a hinge assembly that is operable over a range of angles with a magnetic related torque (e.g., a restoring torque). For example, consider a range of angles that includes angles less than α=0 and that includes angles greater than α=0. For example, consider −75 degrees to +75 degrees, −60 degrees to +60 degrees, −45 degrees to +45 degrees, −30 degrees to +30 degrees, etc. As an example, a magnetic related torque (e.g., a restoring torque) can be sinusoidal in that it can form a portion of a sine function (e.g., plotted versus angle).

As an example, touch may be quantified in newtons, which may be at a level of centi-newtons (cN). For example, a keyboard that has a rather higher actuation force may be rated at 50 cN. As an example, an adjustment force may be of the order of tens of centi-newtons or, optionally, less than 10 cN.

As an example, a housing may be adjustable according to various types of forces, which can include one or more of a preload, a tactile force and an actuation force. As to keyboards, preload is the force required to begin depressing a key. This force arises from partial compression of the spring by the switch at rest: when a switch is assembled, the spring may be compressed by a certain amount by the space inside the switch being shorter than the spring. Preload can be seen by a force curve having a force intercept greater than zero. Preload can help to prevent a key from having a loose, slack feel, especially for people who rest their fingers on the keys. Tactile force, for tactile switches (e.g., including clicky but not linear switches), is the force required to overcome a tactile peak in a force curve. This force may be mechanically unrelated to operation of switch contacts and serve to provide feedback to an operator. Switch actuation may be intended to occur just after this point, when the force level drops off, using the momentum gained to propel a slider forward to an actuation point. As to actuation force, it is the force required to actuate a switch (e.g., to cause it to register a key press). In linear switches, it can set an amount of pretravel required (e.g., how far the switch must be pressed for it to register). In various instances, tactile force can exceed actuation force; noting that linear switches have no notion of tactile force.

As an example, a system can include a keyboard with keys rated according to one or more forces, which can include an actuation force. As an example, a system can include one or more magnetic hinge assemblies that rotatably couple two housings where an adjustment in angle between the two housings can be achieved using a force that is less than the actuation force of keys of a keyboard of the system (e.g., where one of the housings is a keyboard housing and the other housing is a display housing where the force is an adjustment force to adjust the display housing where the keyboard housing remains stationary). In such an example, the system itself can demonstrate whether or not the adjustment force is less than the actuation force.

Figure 11:
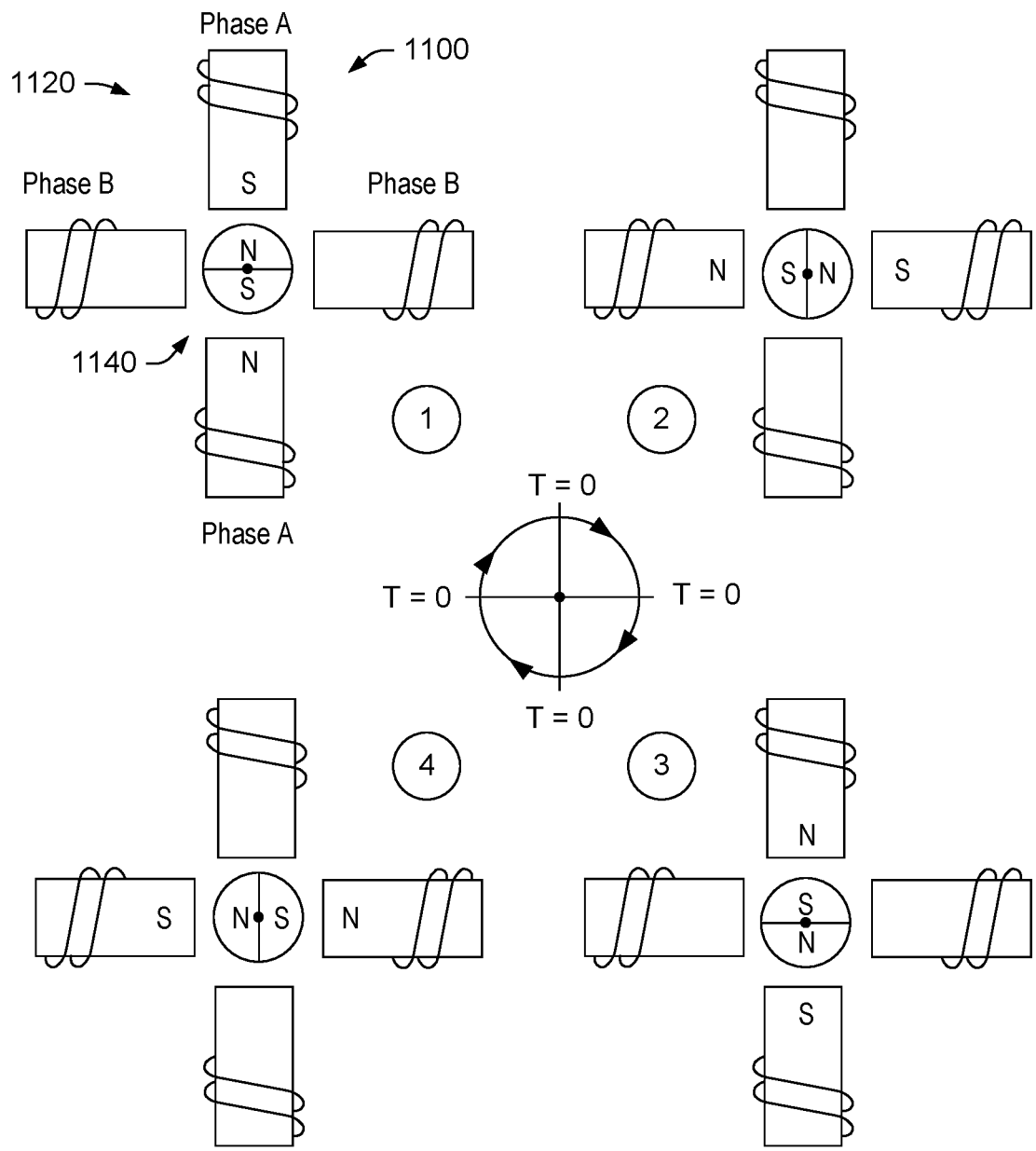
FIG. 11 is a diagram of an example of a two-phase stepper motor.

FIG. 11 shows an example of a two phase (phase A and phase B) stepper motor 1100 with a stator 1120 and a rotor 1140 where phase A or phase B may be activated to cause the rotor 1140 to rotate. As shown, the rotor 1140 can be a permanent magnet that can be rotated at 90 degree increments in a clockwise direction.

Figure 12A:
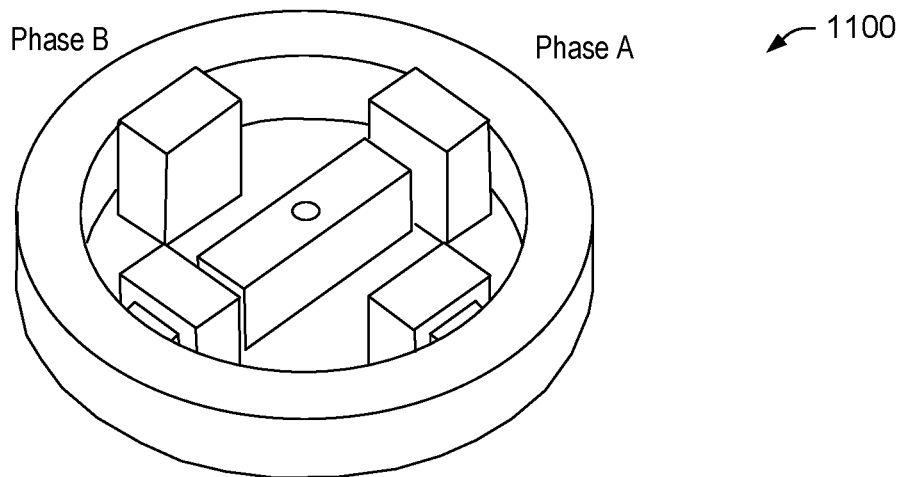
FIG. 12A and FIG. 12B are a series of diagrams of an example of a two-phase stepper motor and an example plot.
Figure 12B:
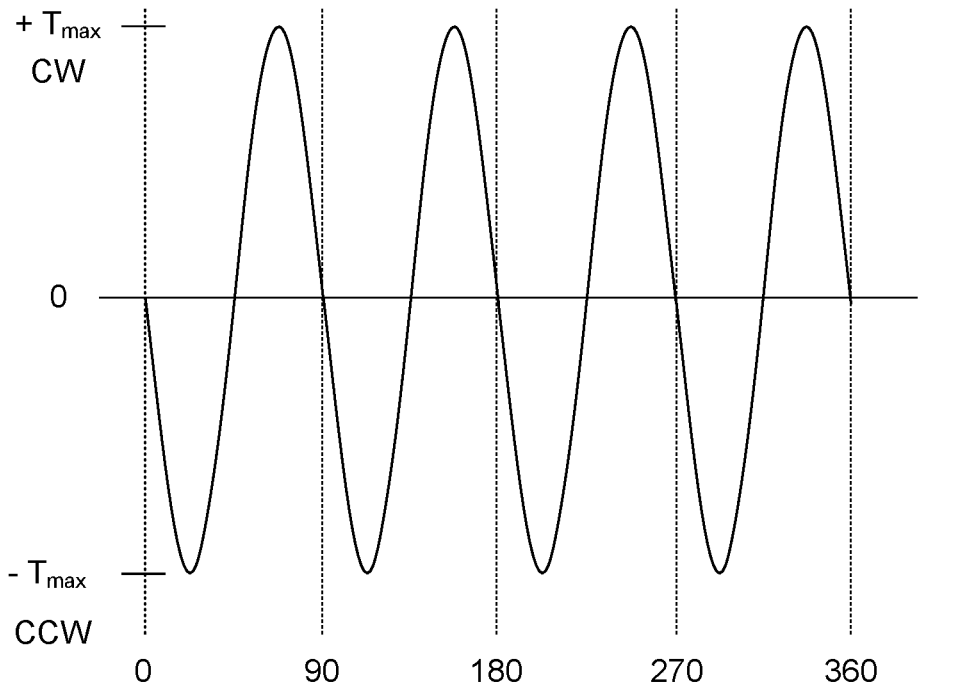
Figure 13A:
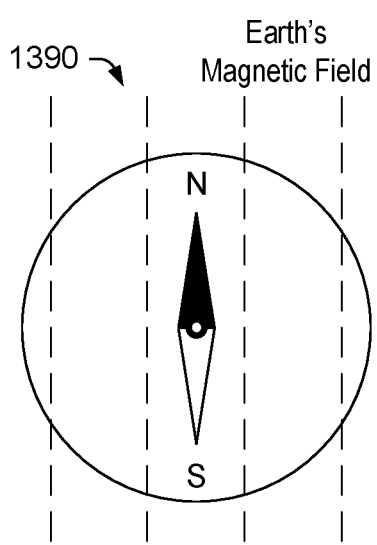
FIG. 13A, FIG. 13B and FIG. 13C are a series of diagrams of an example of a system and examples states.
Figure 13A:
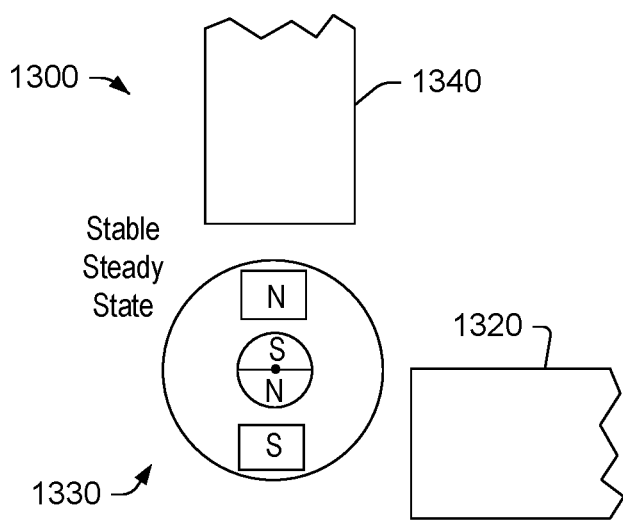
Figure 13B:
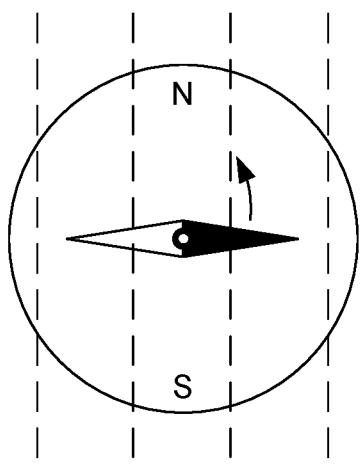
Figure 13B:
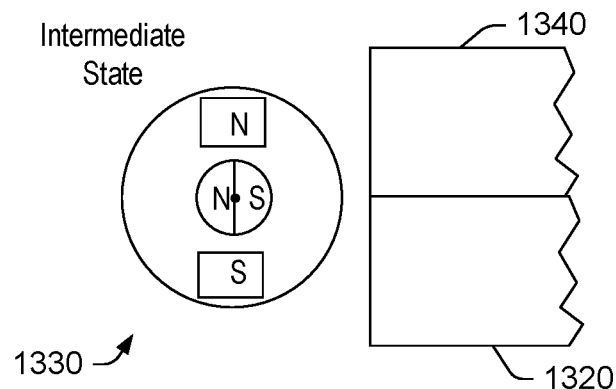
Figure 13C:
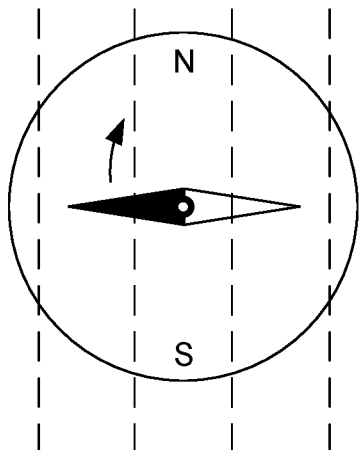
Figure 13C:
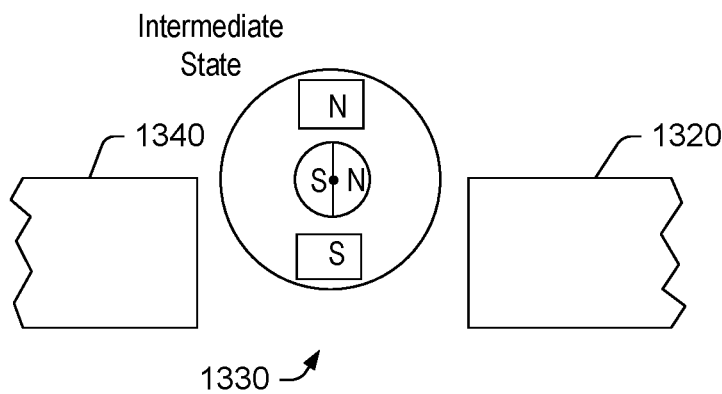

FIG. 12 shows another view of the stepper motor 1100 along with a plot 1200 of no current torque, which may be referred to as cogging torque or detent torque. Such torque can be detrimental to operation of a stepper motor. As shown in the plot 1200, for the two phase stepper motor 1100, the no current torque exhibits a sine function with a full cycle every 90 degrees. Operation of a stepper motor must account for such no current torque, which can be detrimental to operation; noting that a stepper motor is generally intended to be operable in any orientation with respect to gravity.

FIG. 13 shows an example of a system 1300 with reference to states of a compass 1390 influenced by the magnetic field of the Earth. As shown, the system 1300 includes housings 1320 and 1340 rotatably coupled by a hinge assembly 1330. As to the compass 1390, it is shown in a north pointing stable steady state of the compass needle, an east pointing intermediate state of the compass needle where magnetic force urges the needle counterclockwise toward the north pointing stable steady state (e.g., a restoring force) and a west pointing intermediate state of the compass needle where magnetic force urges the needle clockwise toward the north pointing stable steady state (e.g., a restoring force).

A compass needle can be considered to be a magnetic dipole, having a single north pole and a single south pole. A compass needle can be supported on a relatively frictionless mount or spindle such that force of the Earth's magnetic field can cause the compass needle to be in a stable steady state. In various instances, a compass needle can be floating and may be in the form of a floating needle, which may be shaped differently than a needle (e.g., a sphere, a disc, etc.). Where a compass needle is in an unstable steady state (e.g., perfectly anti-aligned with the Earth's magnetic field), a perturbation to the compass needle (e.g., clockwise or counterclockwise) will result in force acting to transition the compass needle to the stable steady state.

A compass is generally operable in a horizontal orientation where the acceleration of gravity may act upon a compass needle evenly about its extent such that the center of mass is aligned with the rotational axis of the compass needle. For example, a compass can be oriented in a plane where the acceleration of gravity is normal to the plane. However, for a compass to work properly, the compass needle must be free to rotate and align with the magnetic field, which can have a declination angle (pointing downward into the Earth). A difference between compasses designed to work in the northern and southern hemispheres can be in the location of a balance weight that is placed on the needle to ensure it remains in a horizontal plane and hence free to rotate. In the northern hemisphere, the magnetic field dips down into the Earth so the compass needle has a weight on the south end of the needle to keep the needle in the horizontal plane; whereas, in the southern hemisphere, the weight is positioned on the north end of the needle.

As explained, a compass operates under the influence of the Earth's magnetic field, which can be measured in tesla or gauss, for example, the strength of the field at the Earth's surface ranges from less than 30 microteslas (0.3 gauss) in an area including most of South America and South Africa to over 60 microteslas (0.6 gauss) around the magnetic poles in northern Canada and south of Australia, and in part of Siberia.

Figure 14:
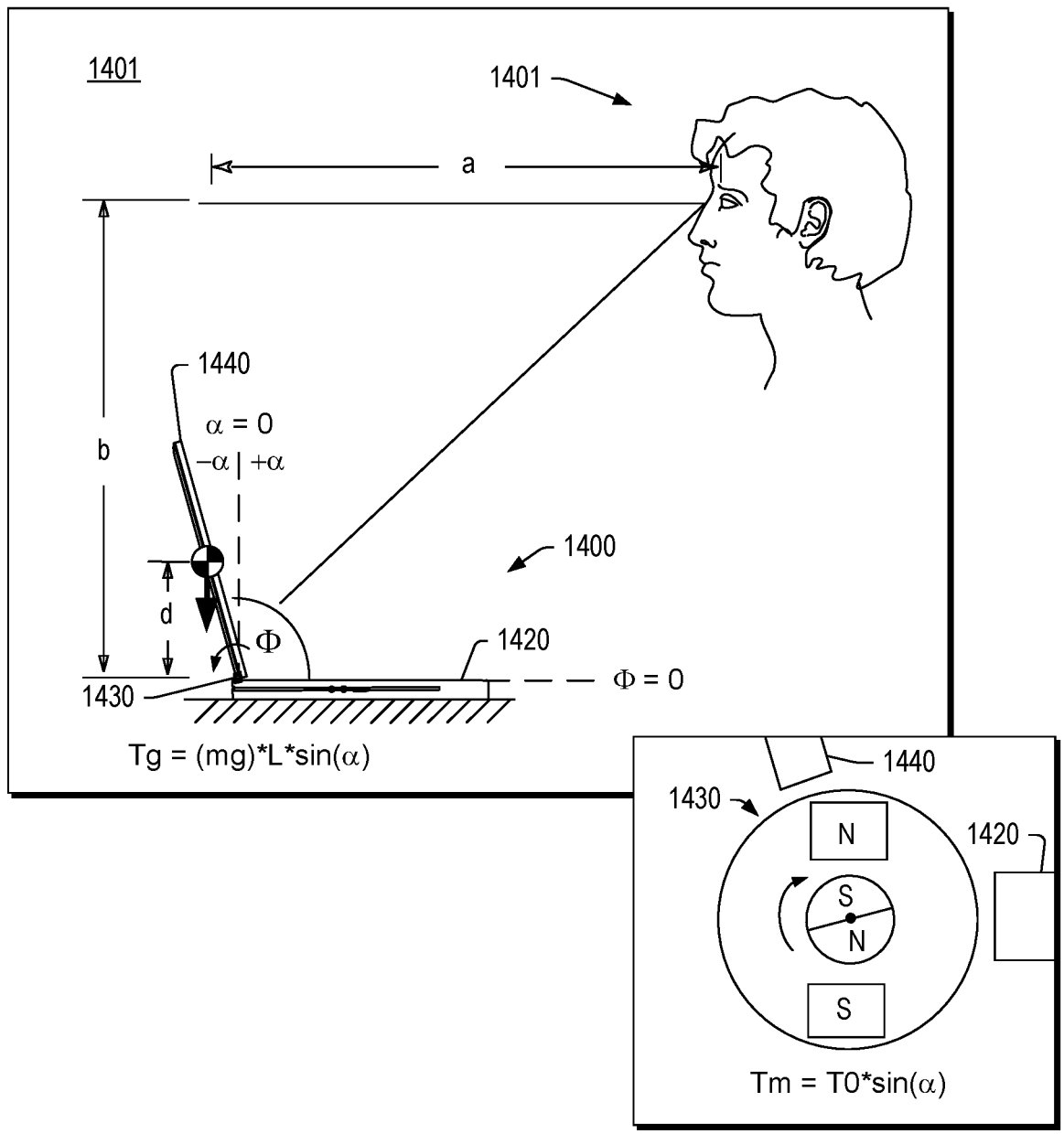
FIG. 14 is a diagram of an example of a system in an example scenario.

FIG. 14 shows an example of a system 1400 with housings 1420 and 1440 in a scenario where eyes of a user 1401 are positioned a horizontal distance a from a rotational axis of a hinge assembly 1430 and a vertical distance b above the rotational axis, where a center of mass of the housing 1440 is a vertical distance d above the rotational axis, where L, as a lever arm, can be defined as the hypotenuse of a triangle with a height equal to the vertical distance d. In the example of FIG. 14, the hinge assembly 1430 can include permanent magnets where a dipole is tilted at an angle within a primary field such that the hinge assembly 1430 counteracts at least a portion of the gravity related torque of the housing 1440 about the rotational axis.

As shown in FIG. 14, the gravity torque can depend on mass, m, gravity, g, lever arm, L, and sine of the angle α while the magnetic torque can depend on a torque T0 and sine of the angle α, where the gravity torque and the magnetic torque can be opposite in directions about an axis of a hinge assembly such that the magnetic torque acts as a restoring torque that counteracts the gravity torque. As an example, where the angle α is 90 degrees, sin(α) equals one. For a balanced arrangement, T0 can be equal to the product mgL (e.g., where m and L may be fixed and constant) but in an opposite direction about an axis of a hinge assembly.

As explained, a stable steady state of permanent magnets can be set to a position where gravity torque is zero. In such an example, the permanent magnets of a hinge assembly may define two dipoles, akin to the Earth's dipole and the dipole of a needle of a compass, where the two dipoles are within a concentric cylinder type of arrangement aligned along a common axis where an outer cylinder and/or an inner cylinder may rotate about the common axis to be in a stable steady state or in an intermediate state and, for example, depending on arrangement, an unstable steady state.

As explained with respect to FIG. 2, a user such as the user 1401 of FIG. 14 may utilize a finger (e.g., a fingertip) to adjust the angle Φ where the force applied may be relatively low, for example, less than an actuation force of a key of a keyboard such as a key of a keyboard of the housing 1420, which is shown as being positioned on a substantially horizontal surface (e.g., a desk surface, a table surface, a countertop surface, etc.).

Figure 15:
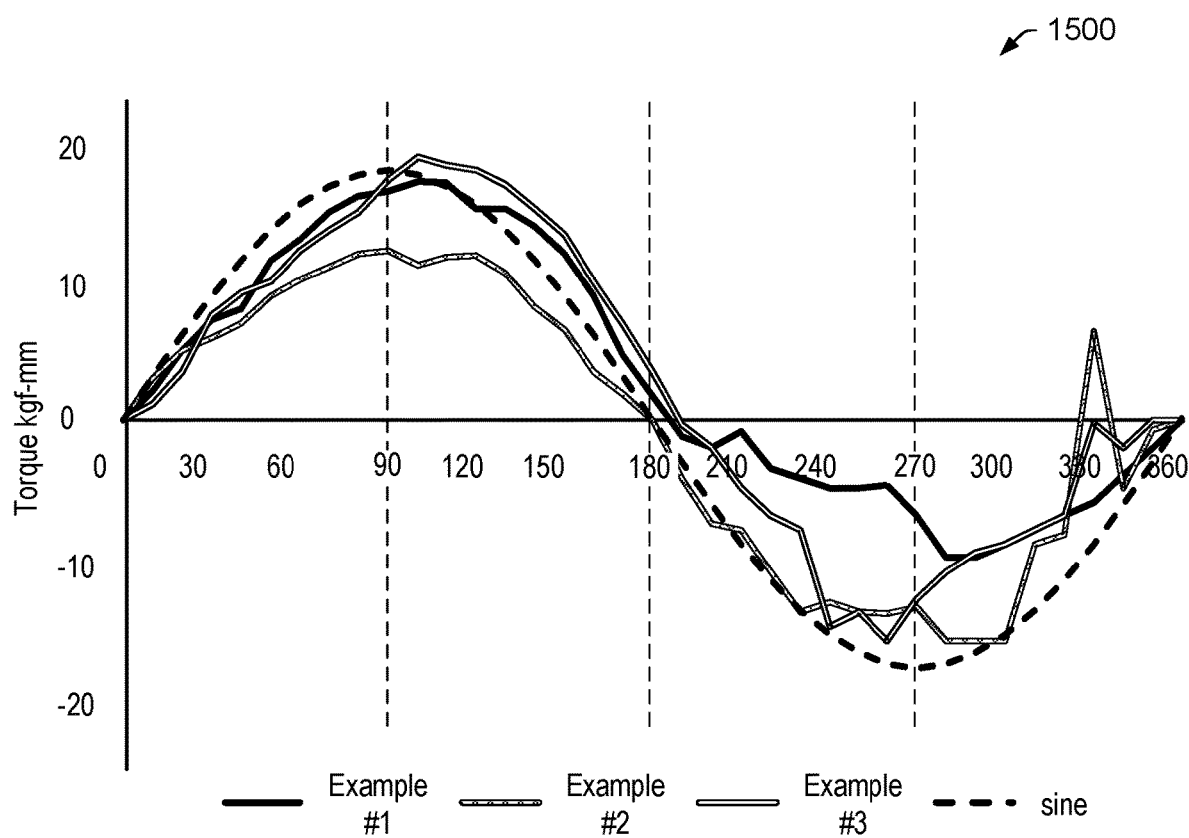
FIG. 15 is a diagram of an example plot.

FIG. 15 shows a plot 1500 of torque versus angle for three example hinge assemblies configured as shown in the example of FIG. 3A and FIG. 3B with respect to a sine function. As shown, a positive torque of approximately 20 kgf-mm and a negative torque of approximately 20 kgf-mm can be achieved for approximately 90 degree rotations from approximately 180 degrees (see, e.g., 90 degrees and 270 degrees).

Consider the example system 700 of FIG. 7 and the equation:

$$Tg=(mg)*L*\sin(\alpha)$$

If the mass of the housing 740 is 0.1 kg and the length L is 0.1 m, with an assumed acceleration of gravity of 10 m/s² then the maximum gravity related torque is approximately 0.1 N-m, which is approximately 10.2 kgf-mm (e.g., 1 N-m equals 101.97 kgf-mm). If a system includes two hinge assemblies, then each hinge assembly may be expected to handle approximately 0.05 N-m (5.1 kgf-mm). In the example of FIG. 15, two hinge assemblies rated at approximate 20 kgf-mm may be able to handle a housing with a mass of approximately 0.4 kg (e.g., approximately 0.9 lb).

As an example, a system may be configured as a clamshell computer that has dimensions of approximately 320 mm×217 mm×15 mm, with a 14 inch display, measured diagonally. In such an example, a keyboard housing can be thicker and heavier than a display housing. For example, a display housing thickness may be less than 50 percent of a keyboard housing thickness and a display housing mass may be less than 50 percent of a keyboard housing mass. In such an example, where a total thickness is 15 mm, the display housing thickness may be less than approximately 5 mm and, for example, where a total mass is approximately 1.1 kg, the display housing mass may be less than approximately 0.37 kg (e.g., approximately 0.82 lb).

As an example, one or more hinge assemblies can include permanent magnets that may be rated at a maximum torque that is greater than a gravity related torque whereby one or more friction elements may hinder movement of a housing with respect to another housing. As an example, one or more hinge assemblies can include permanent magnets that may be rated at a maximum torque that is less than a gravity related torque whereby one or more friction elements may hinder movement of a housing with respect to another housing.

As an example, one or more friction elements may be utilized to address a mismatch between a magnetic torque and a gravity related torque. In such an example, the one or more friction elements may hinder undesirable movement of a housing with respect to another housing. For example, consider undesirable movement of a housing moving toward an angle of a stable steady state of a hinge assembly or undesirable movement of a housing moving toward a low potential energy level state under the influence of gravity.

As an example, the magnetic field and torque in radially magnetized, permanent magnet couplings can be developed from the magnetic scalar potential in the air gap between a shaft and a cylinder. As mentioned, a type of torque can be a cogging torque, which can exist in some types of stepper motor that include multi-pole couplings.

As an example, magnetic couplings can transmit torque without direct mechanical contact. As an example, a radial magnetic coupling can include a shaft, fitted with a circular array of permanent magnet arc segments, which is separated by an air gap from a similar array of permanent magnet arc segments attached to a bore of a cylinder. In such an example, the magnetization of each arc segment may be assumed to be in a purely radial direction, either positive or negative, with the number and arrangement determining the number of poles in the coupling.

In the case of axial magnetic couplings, closed-form expressions for the force and torque have been derived from the magnetic vector potential obtained by solving Laplace's and Poisson's equation for a two-dimensional (2D) analytical model. As set forth herein, magnetic field and torque in radially magnetized couplings can be derived from a two-dimensional analytical model. Exact closed-form expressions can be obtained by solving Poisson's equation for the magnetic scalar potential in the permanent magnet regions and Laplace's equation in the air gap region.

Figure 16:
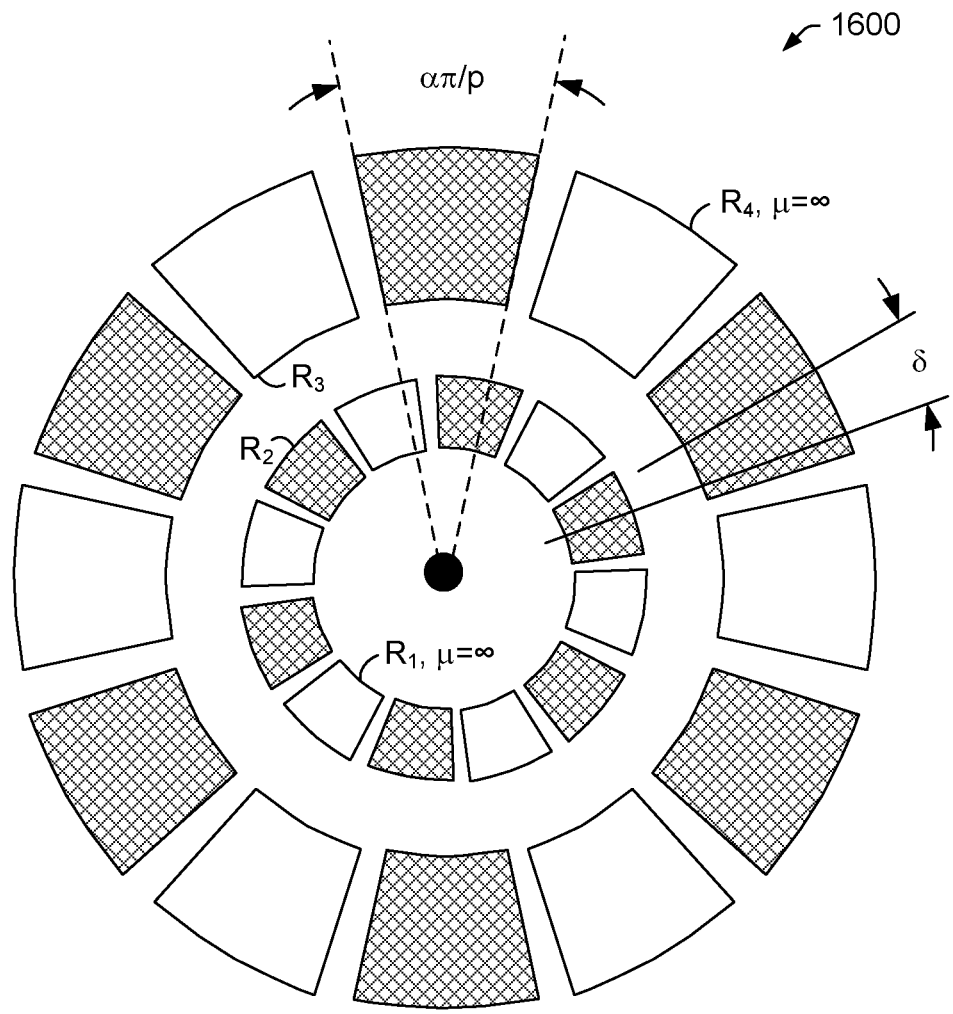
FIG. 16 is a diagram of an example of a multi-pole assembly.

FIG. 16 shows an example of a cross-section of an ideal, radially magnetized coupling 1600. As shown, a circular array of permanent magnet arc segments extends radially to radius $R_2$, from a shaft of radius $R_1$. An air gap separates a corresponding array of permanent magnet arc segments attached to the bore of a cylinder with bore radius $R_4$. The air gap radial clearance is $R_3-R_2$. The pole arc to pole pitch ratio is denoted by a, where the number of poles is p (p=6). The shaft and housing have infinite permeability ($\mu=\infty$, at r=$R_1$ and $R_4$). In FIG. 16, δ is an angular offset (torque angle) used as a parameter in the torque expression.

The alternating hatched and non-hatched segments denote alternating positive and negative radial directions of magnetization in each of the adjacent arc segments. With integer p denoting the number of pole pairs, as mentioned, the example of FIG. 16 shows a p=6 pole-pair, radial, magnetic coupling. The cylinder is assumed to be sufficiently long and losses due to end effects and fringing negligible.

As to a two-dimensional analysis, the following assumptions are made: an iron shaft and cylinder have infinite magnetic permeability (μ=∞); and the radially magnetized permanent magnets have relative recoil permeability (μ_r=1; reasonable for the neodymium-iron-boron (NdFeB) magnets which have μ_r~1.05).

An analysis domain can be separated into three regions: region 1 is the region occupied by permanent magnets attached to the shaft, $R_2 \leq r \leq R_1$; region 2 is the air gap region, $R_3 \leq r \leq R_2$, and region 3 is occupied by the outer constellation of permanent magnets, $R_4 \leq r \leq R_3$. The magnets of region 3 are shown rotated by angle δ (torque angle) relative to the magnets in region 1. From the geometry, the magnetic field distribution is periodic with period T=2π/p.

The constitutive law relating the magnetic flux density vector, B, to the magnetic field intensity vector, H, and the magnetization vector, M, in the permanent magnet regions is:

$$B = \mu(H+M) \qquad (1)$$

where $\mu = 4\pi \times 10^{-7}$ henrys/meter, is the permeability of space.

Derived closed-form expressions can be utilized for one or more purposes. For example, consider computations on a radially magnetized, multi-pole coupling, with parameters given in Table 1 below.

TABLE 1

| Item | Description | Value |
|---|---|---|
| $R_1$ | Inner radius of shaft magnets | $1.5 \times 10^{-3}$ m |
| $R_2$ | Outer radius of shaft magnets | $3.0 \times 10^{-3}$ m |
| $R_3$ | Inner radius of cylinder magnets | $3.25 \times 10^{-3}$ m |
| $R_4$ | Outer radius of cylinder magnets | $5 \times 10^{-3}$ m |
| L | Axial length of magnets | $37 \times 10^{-3}$ m |
| $B_r$ | Residual flux density, N52 magnet | 1.44 Tesla |
| α | Pole arc to pole pitch ratio | 0.9 |
| p | Number of pole-pairs | variable |

Torque calculations may be performed by taking a contour in an air gap with radius equal to a mean radius. Table 2 shows the amplitude of the cogging torque per unit length, computed from torque expressions, for different number of pole-pairs as well as the contribution of the first four terms of k included in the summation.

TABLE 2

| | Number of pole pairs, p | | | | | |
|---|---|---|---|---|---|---|
| Index, k | 1 | 2 | 3 | 4 | 5 | 6 |
| 1 | 15.95 | 24.60 | 27.33 | 27.27 | 26.08 | 24.48 |
| 3 | 1.76 | 2.21 | 1.76 | 1.39 | 1.09 | 0.86 |
| 5 | 0.11 | 0.37 | 0.25 | 0.17 | 0.11 | 0.07 |
| 7 | 0.07 | 0.06 | 0.03 | 0.02 | 0.01 | 0.01 |
| Σ(T/L) = | 17.89 | 27.24 | 29.37 | 28.85 | 27.29 | 25.42 |

The sum converges rapidly and even a single term (k=1) approximation can yield a sufficiently accurate estimate for a preliminary sizing study. Within the range examined for this coupling, the maximum cogging torque that could be achieved is 29.37 N-m per meter of axial length of the magnet segments.

Figure 17:
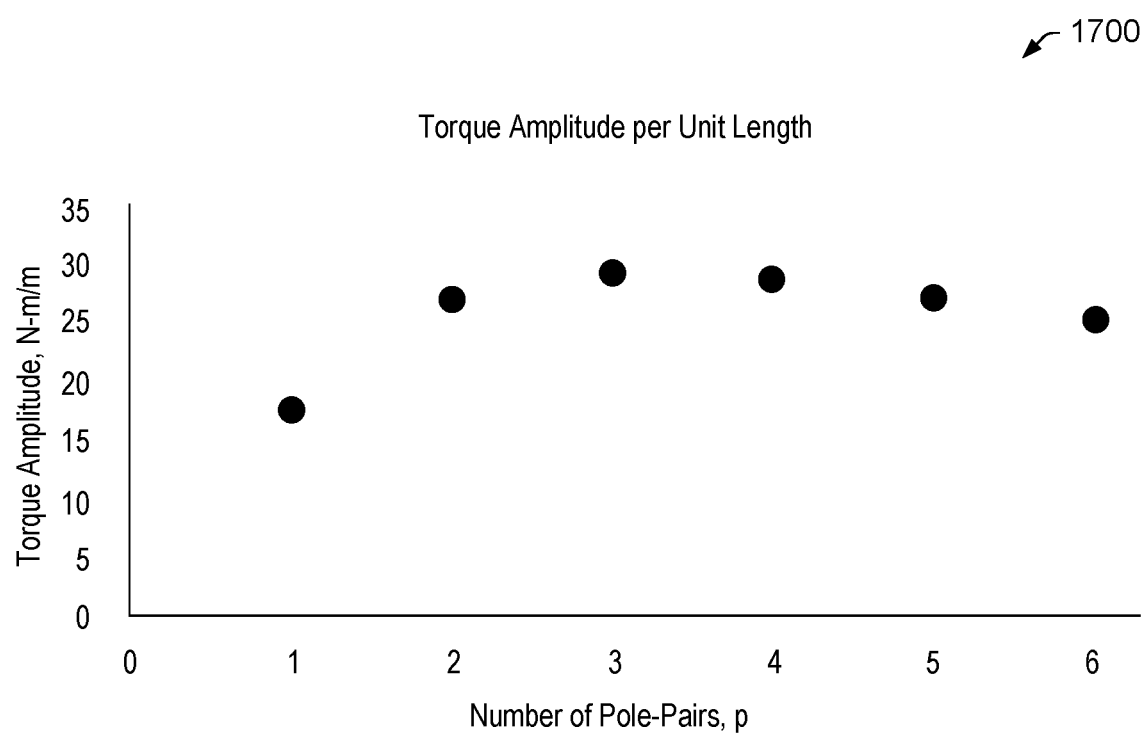
FIG. 17 is a diagram of an example plot.

FIG. 17 shows an example plot 1700 that includes torque versus pole-pair number, p, where a maximum cogging torque corresponds to a 3 pole-pair design.

Torque measurements were taken on several couplings. The magnet segments were constructed from N52 (NdFeB) magnets and samples correspond to the 6 pole-pair geometry of Table 1. Neodymium magnets may be graded according to maximum energy product, which relates to the magnetic flux output per unit volume where higher values indicate stronger magnets. For sintered NdFeB magnets under an international classification scheme, values tend to range from 28 up to 52 (e.g., N28 to N52). In such a scheme, the first letter N before the values is short for neodymium (e.g., sintered NdFeB magnets) and one or more letters that follow the values can indicate intrinsic coercivity and maximum operating temperatures (e.g., positively correlated with the Curie temperature), which may range from default (e.g., up to 80° C. or 176° F.) to AH (e.g., 230° C. or 446° F.). The steel shaft and housing are constructed of SUS403 (e.g., consider chemical composition of C at max. 0.15, Si at max. 0.5, Mn at max. 1.00, P at max. 0.04, S at max. 0.03, Ni at max. 0.6, and Cr at 11.5-13.0). The magnet arc segments are magnetized diametrically (e.g., in a uniform direction) rather than in a truly radial direction. Such an approach can be utilized rather than directly producing a radial magnetization field. As an example, as the number of arc segments increases, the field will better approximate a true radial field.

Figure 18:
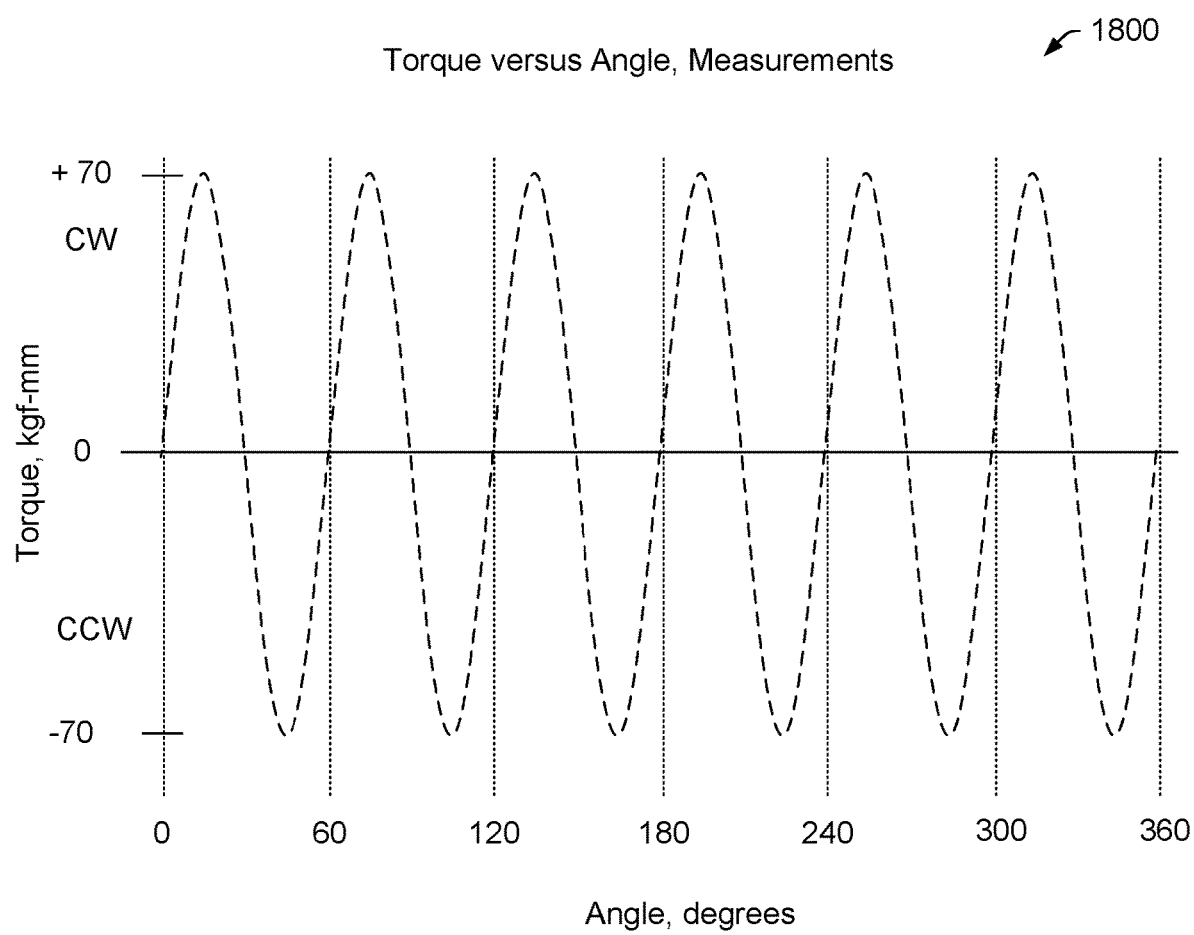
FIG. 18 is a diagram of an example plot.

FIG. 18 shows an example plot 1800 that represents the torque measurements using a single sine function. Measurements were made in both clockwise and counter-clockwise directions and cover one full revolution of the shaft. The average amplitude was approximately 70 kgf-mm. From Table 2, the predicted amplitude of the cogging torque for an ideal, radially magnetized, 6 pole-pair coupling with this geometry would be 95.9 kgf-mm. The prediction may be adjusted and brought into better correlation with the experimental measurements by replacing the value of $B_r$ with a reduced value $B_0$.

The scalar potential for multi-pole, radially magnetized couplings have been derived from the solution of Poisson's equation in the permanent magnet regions, and Laplace's equation in the air-gap region. All field quantities of interest can be obtained from the scalar potentials. In particular, the closed-form expression for the cogging torque is developed, which shows sinusoidal behavior. The theoretical prediction for a 6 pole-pair coupling is compared with measurements taken on several example assemblies, and the utility of the closed-form expression illustrated with a simple parametric study. The model can be correlated to experimental findings in practice. As to various examples of expressions, methods and systems, U.S. patent application Ser. No. 16/915,043, filed 29 Jun. 2020, entitled "System Hinge Assembly", is incorporated by reference herein.

In the example of FIG. 18, six stable equilibrium positions are shown that correspond to the 6 pole pairs, where the other intermediate positions are unstable. Thus, in such an example, there are stable equilibrium positions at 0, 60, 120, 180, 240, and 300 degrees (e.g., where 0 degrees and 360 degrees are the same point) and there are intermediate unstable positions at 30, 90, 150, 210, 270 and 330 degrees. In various examples, the stable equilibrium positions may be utilized for one or more purposes and they may optionally be adjustable. As an example, stable equilibrium positions may be detent positions, which may optionally be adjustable (e.g., physically, electrically, electromagnetically, etc.).

As mentioned, work can be defined as a product of weight (e.g., mg) and distance. For example, if a display housing has a weight of 2 N (e.g., 0.204 kg multiplied by 9.8 m/s²) and a center of mass that is 0.1 m from a rotational axis (e.g., maximum torque of 0.2 N-m or 20.4 kgf-mm), a rotation of the display housing about the rotational axis by an angular increment that increases the vertical height of the center of mass by 0.02 m against gravity would demand work of approximately 0.04 J. However, if the gravity torque is offset by a magnetic torque (e.g., a restoring torque), then the net torque can be zero and the amount of work performed by a user's hand can be approximately zero. As an example, a difference computed between two torque values, which operate in opposing directions, can provide a net torque value. As an example, two torque values can be a maximum gravity torque value and a maximum magnetic torque value where a net torque value can be less than one half of the maximum gravity related torque value, less than one third of the maximum gravity related torque value, less than one quarter of the maximum gravity related torque value, less than one fifth of the maximum gravity related torque value, less than one sixth of the maximum gravity related torque value, or less than one tenth of the maximum gravity related torque value. As an example, consider a maximum gravity related torque of 20.4 kgf-mm and a net torque less than approximately 2 kgf-mm being achieved by a magnetic torque that opposes the gravity related torque.

As an example, consider a maximum net torque of approximately 2 kgf-mm where such a torque can be overcome through use of a user's finger. In such an example, the ergonomic feel of a system can be improved when compared to a system that does not include magnets that provide a restoring torque. As an example, a system may include an electromagnetic mover (EM mover) such as, for example, an electric motor, a solenoid, etc. As to an electric motor, consider a stepper motor that can provide a torque of approximately 2 kgf-mm, which may be actuated to apply the torque in a clockwise direction and/or a counterclockwise direction. In such an example, the electric motor may be actuated to overcome a net torque value that may be less than or equal to 2 kgf-mm to cause movement of a housing, for example, to cause a first housing to move with respect to a second housing where the first housing and the second housing are operatively coupled via a system hinge assembly.

As an example, where a net torque may be less than 2 kgf-mm, an electric motor may be selected that can provide torque that is equal to or greater than the net torque (e.g., in clockwise and/or counterclockwise directions). As an example, where a net torque is approximately 0 kgf-mm, a relatively small electric motor may be utilized.

As an example, consider a system that can include a microphone operatively coupled to audio circuitry such that the system can receive one or more voice commands. For example, consider a voice command to open a clamshell computer or a voice command to close a clamshell computer. As an example, a system can include a touch sensitive surface that can receive touch input where, in response to touch input (e.g., a touch, a gesture, a passcode, etc.), the system can issue an instruction to actuate an electromagnetic mover to cause movement of a housing. As an example, a system can include a timer that can be utilized to actuate an electromagnetic mover to cause movement of a housing. For example, consider a timer that can, after a period of non-use (e.g., idleness), call for an instruction that causes a housing to move such as, for example, to close.

As an example, a system may be instructable to cause movement of a housing by a number of degrees about an axis, to a particular angle with reference to an axis, etc. As an example, a system may include one or more sensors where sensor information from one or more sensors may be utilized to instruct the system to move a housing such as to rotate the housing using a system hinge assembly.

As to some examples of stepper motors, consider one or more Faulhaber stepper motors (Dr. Fritz Faulhaber GmbH & Co KG, Schönaich, Germany), one or more NetMotion stepper motors (NetMotion, Livermore, Calif.), etc.

As an example, a 22 mN-m series AM2224 Faulhaber stepper motor (Dr. Fritz Faulhaber GmbH & Co KG, Schönaich, Germany) may be utilized, which is a two phase, 24 steps per revolution stepper motor that has a shaft diameter of 2 mm, NdFeB magnetic material, a diameter of 22 mm, and a length of approximately 27.7 mm. As an example, a stepper motor may be operatively coupled to a gearbox such that a native step angle can be transformed to a desired step angle. As an example, a 0.25 mN-m series DM0620 Faulhaber stepper motor may be utilized, which is a two phase, 20 steps per revolution stepper motor that has a shaft diameter of 1 mm, NdFeB magnetic material, a diameter of 6 mm, and a length of approximately 9.5 mm. Other Faulhaber stepper motors include series AM0820 0.65 mN-m stepper motors (e.g., 8 mm diameter and approximately 13.8 mm length), series AM1020 1.6 mNm stepper motors (e.g., 10 mm diameter and approximately 15.9 mm length), series DM1220 2.4 mN-m stepper motors (e.g., 12 mm diameter and approximately 17.6 mm length), series AM1524 6 mN-m stepper motors (e.g., 15 mm diameter and approximately 16.4 mm length), etc. As mentioned, a torque rating may be selected based on a net torque that accounts for a magnet torque that can be a restoring torque. Suppliers of stepper motors can provide details on torque, which may be specified for various types of operations, states, currents, voltages, etc. As an example, a stepper motor can include an encoder, which may be a magnetic encoder, an optical encoder, etc.

As an example, a stepper motor can be a relatively small stepper motor such as a stepper motor with a diameter less than approximate 25 mm, less than approximately 15 mm, less than approximately 10 mm, etc. As an example, a stepper motor may be operatively coupled to a gearbox (e.g., a transmission, etc.) to provide for a suitable range of adjustments, which may be for a number of step angles. As an example, a gearbox may reduce a step angle, for example, consider reducing a step angle from 18 degrees for 20 steps about 360 degrees to a step angle of 1 degree, a step angle of 2 degrees, etc. As an example, a range may correspond to an expected range of use of a display housing (e.g., a range of angle $\Phi$). For example, where an expected range of adjustment of an optical axis is +/−10 degrees from a normal outward vector of a display, a gearbox may reduce a step angle to 1 degree where 20 steps corresponds to a full rotation of 360 degrees of a motor shaft of a stepper motor (e.g., consider +/−180 degrees). As an example, a gearbox (e.g., a transmission, etc.) may provide a reduction ratio. For example, consider the NetMotion series 08/1 with reduction ratios of 4:1, 16:1, 64:1, 256:1, 1024:1 and 4096:1. Such a gearbox can have a diameter of approximately 25 mm or less, with a body length of approximately 10 mm to 40 mm.

As an example, an electromagnetic mover may be an electric servomotor. For example, consider the linear DC-servomotors marketed by Faulhaber (e.g., consider a LM1247 linear DC-servomotor, etc.). As an example, a linear mover (e.g., a solenoid, linear motor, etc.) can be operatively coupled to a transmission, which may be a ratcheting transmission or another type of linear to rotational transmission. As an example, a transmission may utilize one or more cams.

The aforementioned example linear DC-servomotor LM1247 can apply a continuous force of approximately 3.6 N (e.g., peak force of approximately 10 N) and have a maximum stroke length of approximately 120 mm. As to dimensions, it has a width of approximately 12.5 mm, a height of approximately 19 mm and a length of approximately 50 mm.

Figure 19:
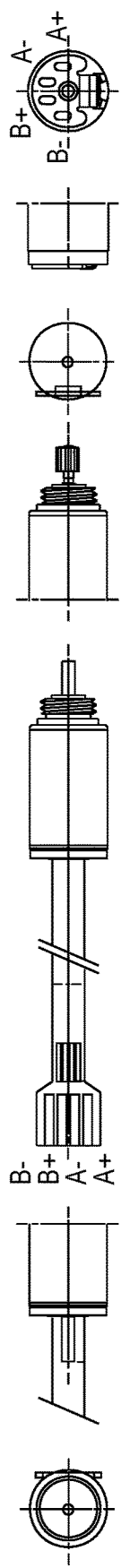
FIG. 19 is a series of diagrams of an example of an adjustment assembly.
Figure 19:
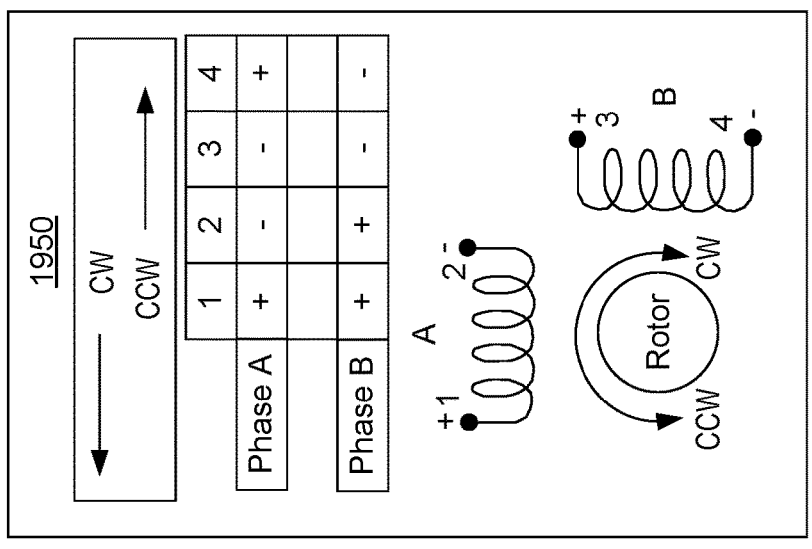
Figure 19:
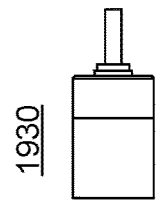
Figure 19:
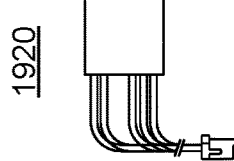
Figure 19:
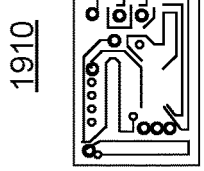

FIG. 19 shows an example of an adjustment assembly 1900 that can include a control board 1910, a connector 1920 and a stepper motor 1930, optionally operatively coupled to a gearbox. FIG. 19 also shows a table 1950 with indications as to directions and phases. For example, consider phases A and B where a combination of plus and minus of each phase provides for four states (e.g., + +, − +, − −, + −).

Figure 20:
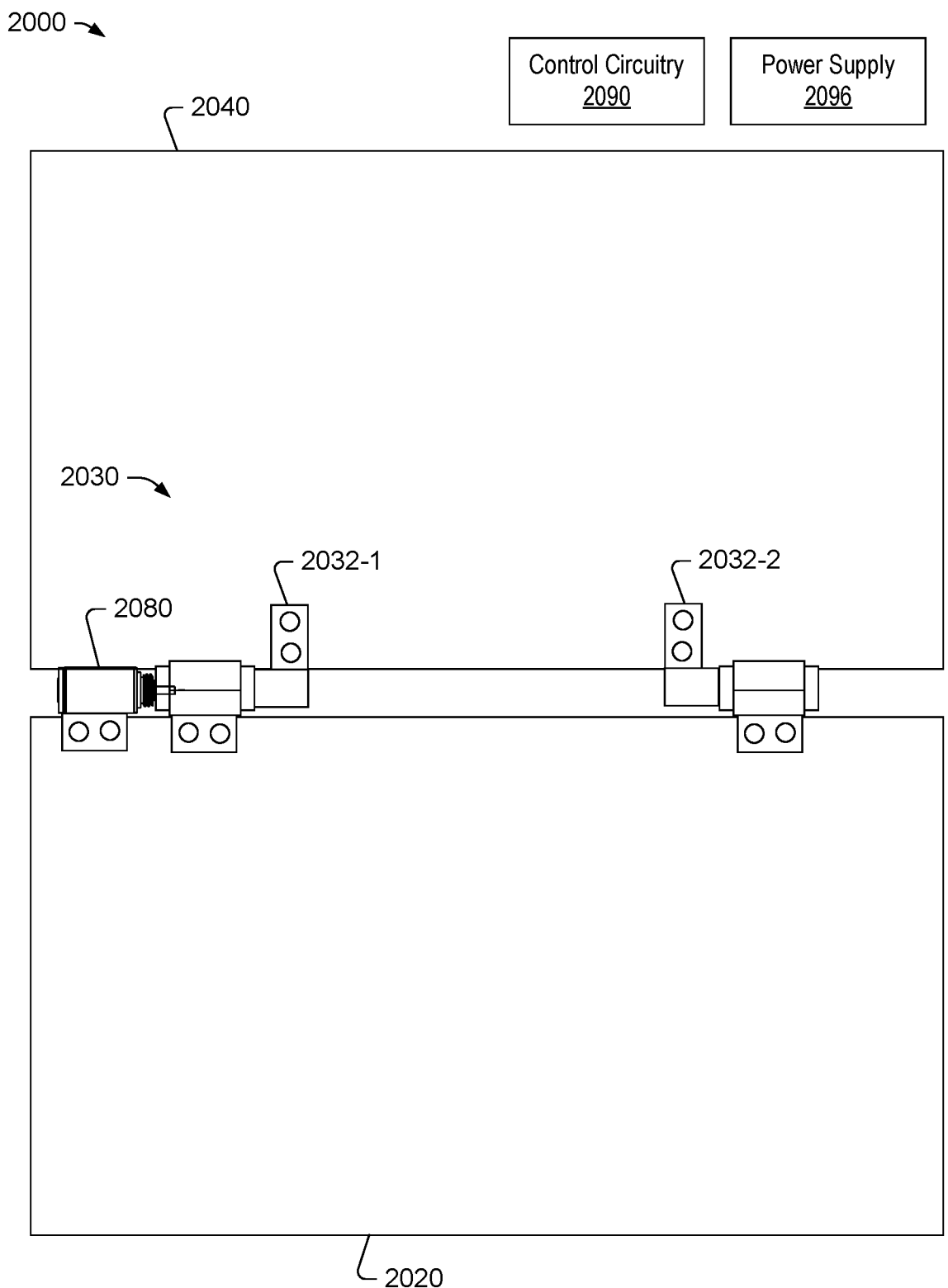
FIG. 20 is a diagram of an example of a system.

FIG. 20 shows an example of a system 2000 that includes a housing 2040; a hinge assembly 2030 operatively coupled to the housing 2040 for rotation of the housing about a hinge axis, where the hinge assembly 2030 includes permanent magnets that generate a first magnetic field and a second magnetic field orientable with respect to each other via rotation of the housing 2040, where the first magnetic field and the second magnetic field include an aligned orientation, generate a clockwise restoring torque responsive to rotation of the housing 2040 in a first rotational direction from the aligned orientation, and generate a counterclockwise restoring torque responsive to rotation of the housing 2040 in a second, opposite rotational direction from the aligned orientation; and an electromagnetic mover 2080 operatively coupled to the housing 2040 for rotation of the housing 2040 about the hinge axis.

In the example of FIG. 20, the system 2000 can include another housing 2020, which may be coupled to the housing 2040 via the hinge assembly 2030. In the example of FIG. 20, the system 2000 can include control circuitry 2090, which can be operatively coupled to the electromagnetic mover 2080. In the example of FIG. 20, the control circuitry 2090 may be carried by a housing, such as, for example, the housing 2020 and/or the housing 2040.

In the example of FIG. 20, the hinge assembly 2030 can include multiple hinges such as a hinge 2032-1 and a hinge 2032-2. In such an example, the hinge 2032-1 and/or the hinge 2032-2 can include permanent magnets.

In the example of FIG. 20, the electromagnetic mover 2080 can be an electric motor that can include a rotatable shaft that can be operatively coupled to a portion of the hinge assembly 2030 to cause rotation of the housing 2040 about the axis of the hinge assembly 2030, which may be aligned with a rotational axis of the rotatable shaft of the electric motor.

As an example, a system can include one or more hinges operatively coupled to an electromagnetic mover.

In the example of FIG. 20, the system 2000 can include a power supply 2096 such as one or more batteries such as, for example, one or more rechargeable lithium-ion batteries.

Figure 21:
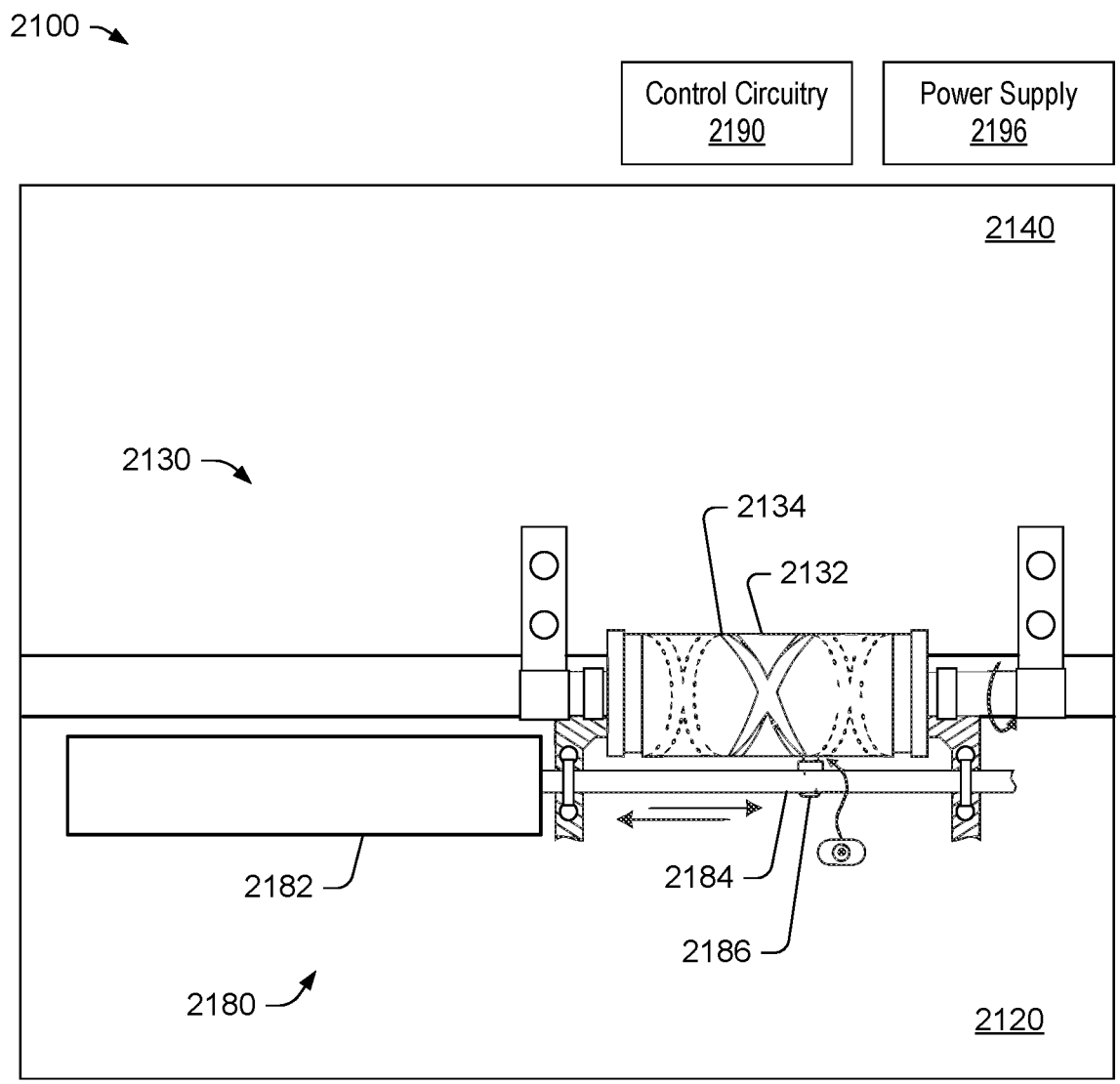
FIG. 21 is a diagram of an example of a portion of a system.

FIG. 21 shows an example of a system 2100 that includes a housing 2140; a hinge assembly 2130 operatively coupled to the housing 2140 for rotation of the housing about a hinge axis, where the hinge assembly 2130 includes permanent magnets that generate a first magnetic field and a second magnetic field orientable with respect to each other via rotation of the housing 2140, where the first magnetic field and the second magnetic field include an aligned orientation, generate a clockwise restoring torque responsive to rotation of the housing 2140 in a first rotational direction from the aligned orientation, and generate a counterclockwise restoring torque responsive to rotation of the housing 2140 in a second, opposite rotational direction from the aligned orientation; and an electromagnetic mover 2180 operatively coupled to the housing 2140 for rotation of the housing 2140 about the hinge axis. For example, as shown, the electromagnetic mover 2180 can be attached to a housing or base 2120 where the hinge assembly 2130 operatively couples the electromagnetic mover 2180 to the housing 2140.

In the example of FIG. 21, the electromagnetic mover includes a coil body 2182 and a shaft 2184 with a coupling 2186 where the shaft 2184 can translate along a shaft axis and where the hinge assembly 2130 includes a barrel 2132 with a groove or grooves 2134 where the coupling 2186 can interact with the groove or grooves 2134 to cause rotation of the barrel 2132, which can thereby cause rotation of the housing 2140 about the hinge axis (e.g., a longitudinal axis of the barrel 2132).

In the example of FIG. 21, the hinge assembly 2130 includes one or more transmission components that, as shown, can provide for transformation of linear motion to rotational motion. In the example of FIG. 21, by cutting the continuous spiral groove 2134 on a cam surface of the barrel 2132 and by placing an elliptical shape slider coupling 2186 on the shaft 2184 that can be moved to slide along the spiral groove 2134, the elliptical shape slider coupling 2186 linear motion of the shaft 2184 can cause rotation of the barrel 2132. In such an example, rotation of the barrel 2132 may cause linear movement of the shaft 2184. For example, consider a manual closing of a display housing with respect to a keyboard housing of a clamshell computing system where a shaft of a linear electromagnetic mover may translate responsive to closing of the display housing. In such an example, the electromagnetic mover 2180 may be energized or not energized, for example, to provide for torque, ergonomic feel, etc. As an example, once a shaft experiences translation responsive to manual movement of a housing, the electromagnetic mover 2180 may be actuated to continue the movement in the same rotational direction automatically, for example, without a need for manually applied force. As an example, the electromagnetic mover 2080 of FIG. 20 may operate in a similar mode.

In the example of FIG. 21, the system 2100 can include control circuitry 2190, which can be operatively coupled to the electromagnetic mover 2180. In the example of FIG. 21, the system 2100 can include a power supply 2196 such as one or more batteries such as, for example, one or more rechargeable lithium-ion batteries.

As an example, an electromagnetic mover can include one or more gears that can be rotatable and mesh with one or more other gears to cause rotation of a housing about an axis of a hinge assembly. As explained, one or more techniques may be utilized to operatively couple an electromagnetic mover to a housing for rotation of the housing.

As an example, a motorized hinge assembly can include permanent magnets that provide a restoring torque where such a restoring torque can reduce torque demand on an electric motor. In such an example, the motorized hinge assembly may be part of a system where a portion of the system can be rotated about an axis of the motorized hinge assembly. In such an example, the axis may be defined by an axle, a bushing, etc. As an example, a system may include two portions where one of the two portions can be rotated with respect to the other one of the two portions. As an example, a portion can include a display, solar cells, a mirror, etc. As an example, a portion can be a panel, which can be a substantially planar structure such as a display, a solar cell array, etc.

As an example, a system can be a clamshell computing system with two housings rotatably coupled via an electromagnetic hinge assembly that includes permanent magnets that can provide a restoring torque and an electromagnetic mover. In such an example, the electromagnetic mover can be a rotational mover or a linear mover where torque can be generated directly or indirectly to cause rotational movement of one of the housings with respect to the other one of the housings. For example, consider a display housing and a keyboard housing where the display housing can be rotated via action of the electromagnetic mover.

As an example, a system can be a solar energy generation system with a housing (e.g., a panel of solar cells) that is rotatably coupled to a base via an electromagnetic hinge assembly that includes permanent magnets that can provide a restoring torque and an electromagnetic mover. In such an example, the electromagnetic mover can be a rotational mover or a linear mover where torque can be generated directly or indirectly to cause rotational movement of the housing with respect to the base. For example, consider panel of solar cells that includes a housing that supports the solar cells where the panel of solar cells can be rotated via action of the electromagnetic mover. In such an example, rotation may be to optimize or otherwise achieve a desired angle of the panel of solar cells with respect to a position of the sun.

As an example, a solar energy generation system may include a central collector where one or more mirrors are utilized to direct solar rays to the central collector. In such an example, a mirror may be rotatably coupled to a base via an electromagnetic hinge assembly that includes permanent magnets that can provide a restoring torque and an electromagnetic mover. In such an example, the electromagnetic mover can be a rotational mover or a linear mover where torque can be generated directly or indirectly to cause rotational movement of the mirror with respect to the base. In such an example, a mirror can be a panel and may be a housing that includes a mirrored surface. As an example, a mirror may be shaped such as an optical element, which may be defined by one or more optical parameters (e.g., focal length, curvature, etc.). As an example, a mirror can be a mirror assembly where a mirrored surface is carried by a housing where the housing may protect the mirrored surface, which may be a surface of a glass object. As an example, a housing can include a mount that provide for coupling the housing to an electromagnetic hinge assembly, which can couple to a base.

Figure 22:
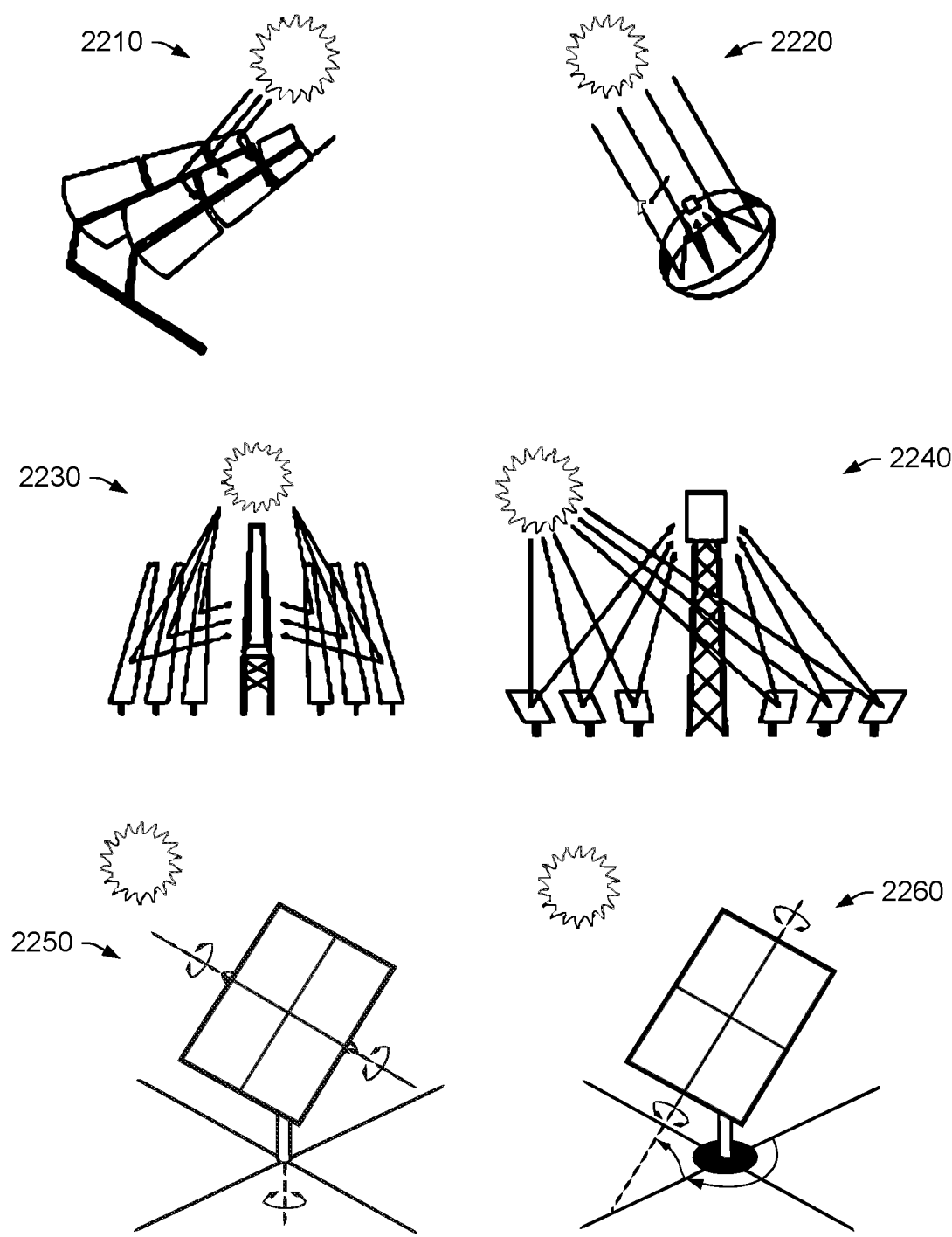
FIG. 22 is a series of diagrams of examples of solar energy generation systems.

FIG. 22 shows some examples of solar energy generation systems 2210, 2220, 2230, 2240, 2250 and 2260. As shown, the system 2210 includes reflectors (e.g., mirrors) with absorber tubes and field conduits, the system 2220 includes a reflector and a collector, the system 2230 includes curved mirrors and an absorber tube, the system 2240 includes mirrors and a tower collector, the system 2250 includes a panel rotatable about at least one axis, and the system 2260 includes a panel rotatable about at least one axis. In such examples, one or more electromagnetic hinge assemblies may be utilized that include permanent magnets that can provide a restoring torque and an electromagnetic mover. In such an example, the electromagnetic mover may optionally be powered via solar energy.

As an example, utilization of permanent magnets in a hinge assembly can reduce requirements for rotating a housing about an axis using an electromagnetic mover. In such an example, the electromagnetic mover may be of lesser size, lesser mass, lesser power demands, etc. For example, for a clamshell computing system, an electromagnetic mover may be of a size that can be suitable for relatively seamless integration without impacting overall size. As mentioned, where a net torque is reduced to near zero relative to a gravity related torque (e.g., a relatively low percentage of the gravity related torque, etc.), an electromagnetic mover may be integrated into a clamshell computing system without oversizing.

Various types of electromagnetic movers have a relationship between torque and one or more of size, mass and power demands. For example, consider the aforementioned Faulhaber series electric stepper motors where maximum torque decreases with respect to diameter.

As explained, without use of permanent magnets for provision of restoring torque, a system may require a size of motor (e.g., due to torque requirement) that is relatively large with an accompanying increase in motor mass and linkage mass, which can be accompanied by an increase in power demand (e.g., battery requirements, etc.). Where restoring torque is utilized, as provided by permanent magnets, a smaller size motor may be utilized (e.g., with lesser mass) that demands lesser power to operate. For example, where a system can operate using a local power supply (e.g., internal battery), less power may be utilized for operation of an electromagnetic mover.

Figure 23:
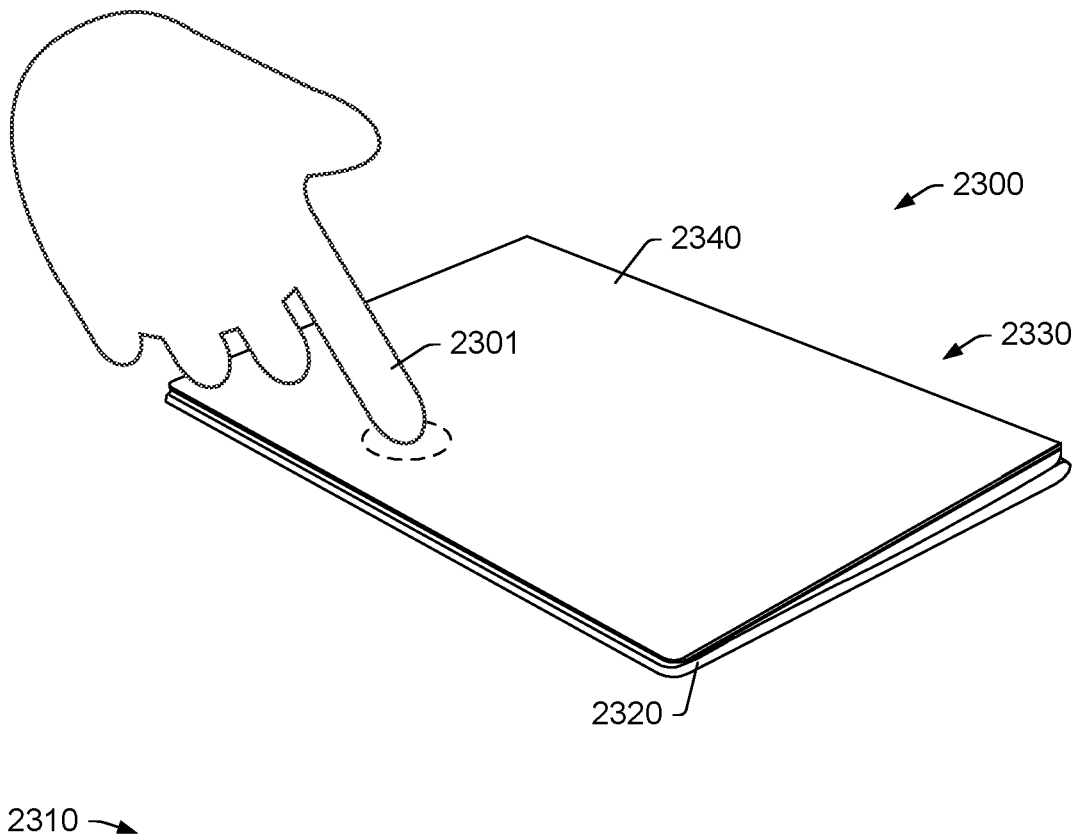
FIG. 23 is a series of diagrams of an example of a system and an example of a method.
Figure 23:
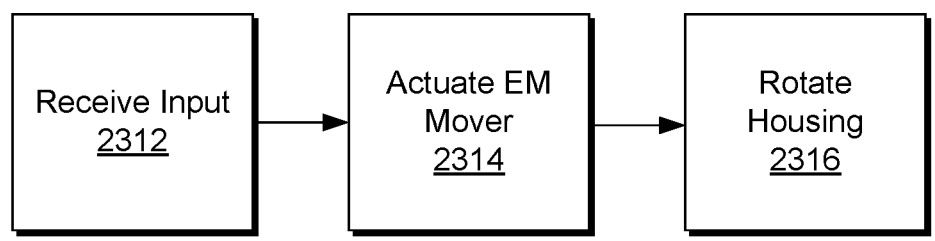

FIG. 23 shows an example of a system 2300 and a user's finger 2301 where the system 2300 includes housings 2320 and 2340 rotatably coupled via an EM mover hinge assembly 2330. FIG. 23 also shows an example of a method 2310 that includes a reception block 2312 for receiving input, an actuating block 2314 for actuating the EM mover, and a rotate block 2316 that, responsive to actuation of the EM mover, provides for rotating the housing 2340 with respect to the housing 2320. For example, the user may touch an outer surface of the housing 2340 that can be a touch sensitive surface that can receive touch input. In such an example, the touch sensitive surface may be pressure sensitive, capacitive, resistive, etc. For example, the system 2300 can include one or more sensors that can sense one or more physical phenomena for receiving input that can be directly or indirectly utilized to actuate an EM mover.

As mentioned, a system may respond to a gesture. For example, consider the finger 2301 or fingers making a gesture on an outer surface of the housing 2340 and/or on another surface (e.g., an edge of the housing 2320, an edge of the housing 2340, etc.).

Figure 24:
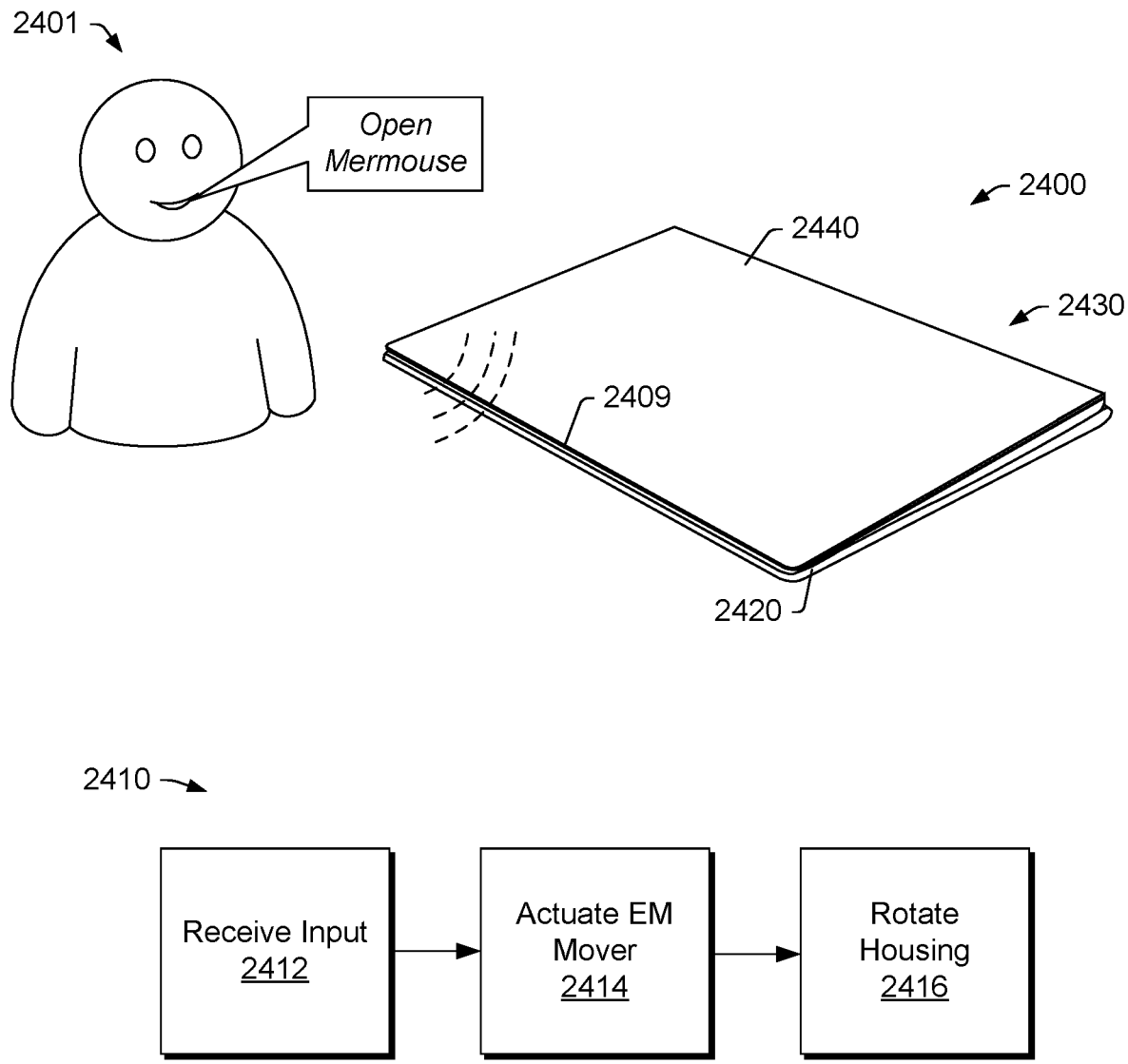
FIG. 24 is a series of diagrams of an example of a system and an example of a method.

FIG. 24 shows an example of a system 2400 and a user 2401 where the system 2400 includes housings 2420 and 2440 rotatably coupled via an EM mover hinge assembly 2430. FIG. 24 also shows an example of a method 2410 that includes a reception block 2412 for receiving input, an actuating block 2414 for actuating the EM mover, and a rotate block 2416 that, responsive to actuation of the EM mover, provides for rotating the housing 2440 with respect to the housing 2420. For example, the user 2401 may utter a command that can be received via one or more microphones 2409 of the system 2400 where the one or more microphones 2409 are operatively coupled to voice recognition circuitry that can associate an action with the uttered command and, for example, determine if the command is directed to the system 2400, optionally using a keyword or password (e.g., "mermouse", which may be a name the user 2401 has given to the system 2400). In such an example, the one or more microphones 2409 can receive sound wave input; noting that the system 2400 can include one or more sensors that can sense one or more physical phenomena for receiving input that can be directly or indirectly utilized to actuate an EM mover.

Figure 25:
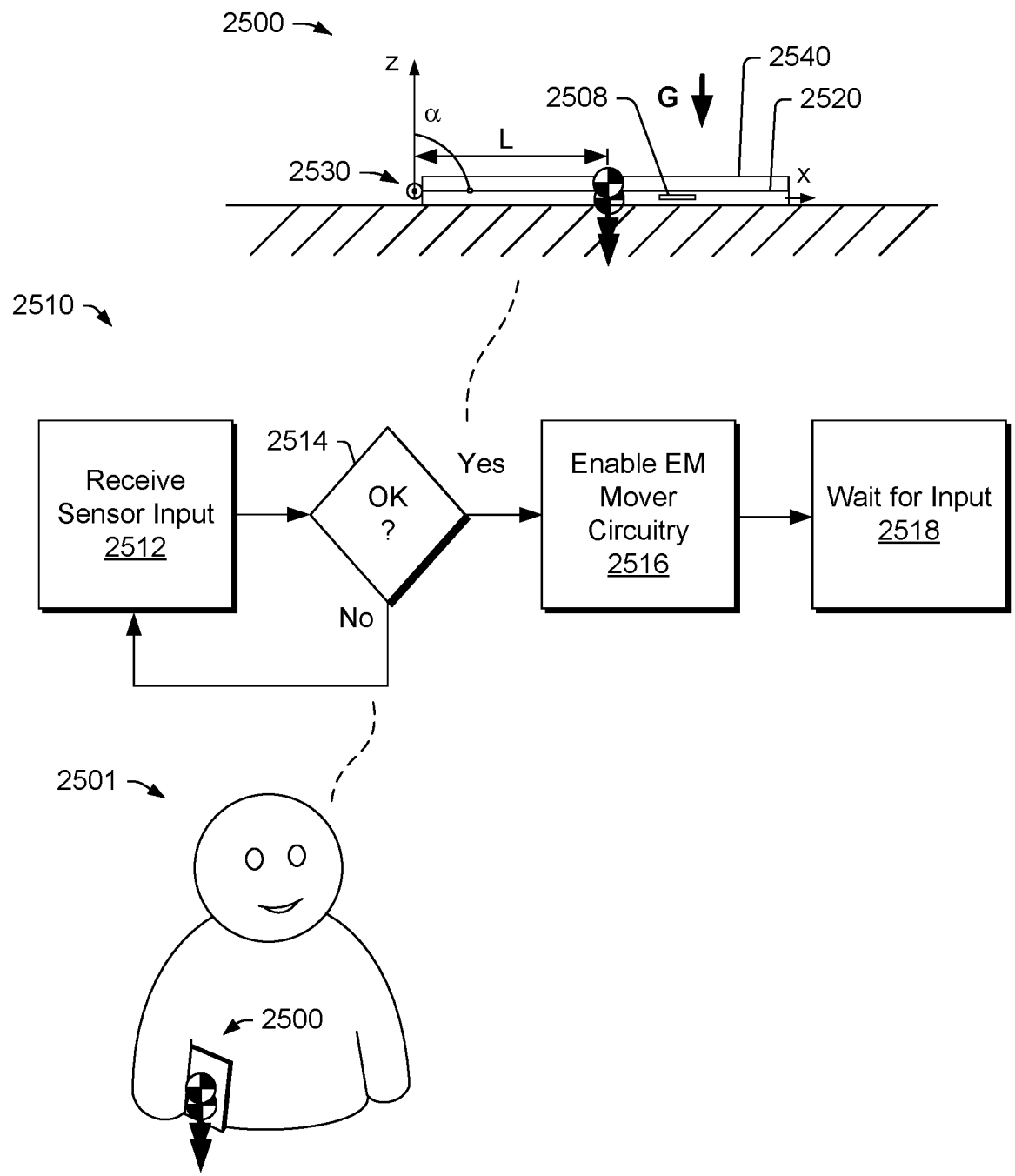
FIG. 25 is a series of diagrams of an example of a system and an example of a method.

FIG. 25 shows an example of a system 2500 and a user 2501 where the system 2500 includes a directional sensor 2508 and housings 2520 and 2540 rotatably coupled via an EM mover hinge assembly 2530. FIG. 25 also shows an example of a method 2510 that includes a reception block 2512 for receiving input from the directional sensor 2508, a decision block 2514 for making a decision as to whether directional information from the directional sensor indicates that the system 2500 (e.g., the housing 2520, etc.) is oriented suitably for proper operation of an EM mover of the EM mover hinge assembly, an enable block 2516 for enabling EM mover circuitry and a wait block 2518 for waiting for input such as a command that can cause actuation of the EM mover via the enabled EM mover circuitry.

In FIG. 25, the system 2500 is shown in an orientation suitable for proper operation where the system 2500 is supported on a substantially horizontal surface and is shown in an orientation that is not suitable for proper operation where the system 2500 is being carried by the user 2501 in a substantially vertical orientation.

As an example, the directional sensor 2508 can be or include one or more of an accelerometer, a gyroscope, a metallic fluid switch (e.g., a level switch), etc. Such types of sensors can provide directional information as to whether the system 2500 is oriented in an acceptable orientation for enabling EM mover circuitry. As mentioned, a hinge assembly can include permanent magnets that can provide a restoring torque; however, in various instances, the restoring torque may not provide for a substantial reduction in gravity related torque. As an example, one or more orientations may be for one or more reasons not suitable for operation of the EM mover, for example, to open or close a clamshell computing system. The method 2510 can include deciding whether or not to enable (e.g., or to disable) EM mover circuitry for one or more reasons.

As to acceptable orientations, for example, consider a range of angles from approximately minus N degrees to plus M degrees. In such an example, the angles may be symmetric or asymmetric about horizontal being zero degrees. For example, consider a desk that may have a desktop surface that is angled downwardly such that a front edge of the system 2500 is lower than a back edge of the system 2500. In such an example, a range from 0 degrees to approximately minus 30 degrees may be acceptable. As to another scenario, consider a user sitting on a chair with the user's hips elevated with respect to the user's knees such that the user's thighs (e.g., lap) slants downwardly away from the hips of the user. In such a scenario, where a user places a clamshell computing system (e.g., a laptop) on her lap, the front edge of the system 2500 can be higher than a back edge of the system 2500. In such an example, a range from 0 degrees to approximately plus 20 degrees may be acceptable.

As explained, acceptability may depend on how torque versus opening angle curves align or not where one curve corresponds to a gravity related torque and the other curve corresponds to a magnet related torque where a net torque may be determined. As explained, an EM mover may be selected based on net torque, which, as mentioned, may depend on orientation of a system (e.g., orientation of a base, a housing, etc.).

Figure 26:
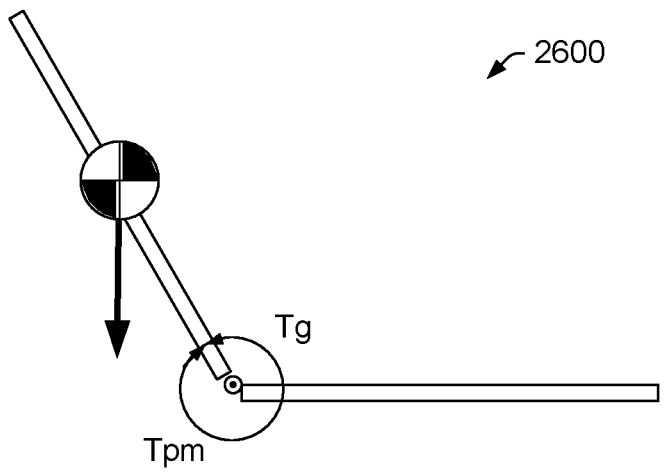
FIG. 26 is a series of diagrams of an example of a system and an example of a method.
Figure 26:
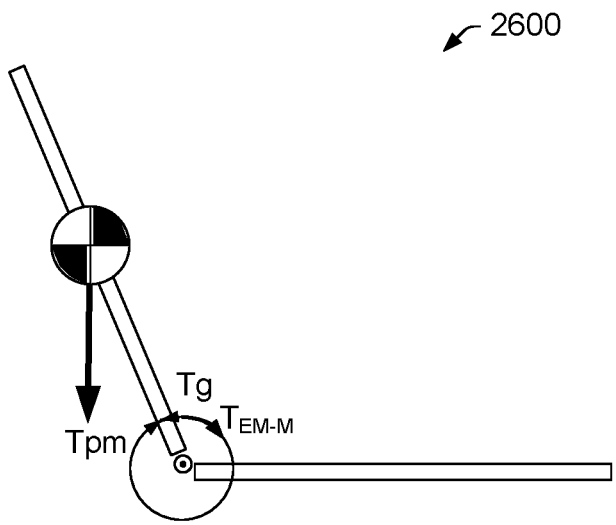

FIG. 26 shows an example of an information handling system (IHS) 2600 and an example of a method 2610 that includes a stabilization block 2612 for stabilizing a position of a display housing with respect to a keyboard housing of an information handling system that includes a hinge assembly that rotatably couples the display housing and the keyboard housing, where the hinge assembly includes permanent magnets that generate a restoring torque that counteracts a gravity related torque of the display housing about the hinge assembly and where the hinge assembly includes an EM mover. In such an example, the position of the display housing with respect to the keyboard housing can be characterized by an angle between the display housing and the keyboard housing that is greater than 90 degrees where, for example, the position is a first position and where the method includes stabilizing a second position of the display housing with respect to the keyboard housing, where the second position is characterized by an angle between the display housing and the keyboard housing that is less than 90 degrees. As an example, a position of the display housing with respect to the keyboard housing may be characterized by an angle between the display housing and the keyboard housing that is less than 90 degrees. In such an example, the position can be a first position and the method can include stabilizing a second position of the display housing with respect to the keyboard housing, where the second position is characterized by an angle between the display housing and the keyboard housing that is greater than 90 degrees. As an example, an angle of 90 degrees can be an angle that aligns the display housing with the direction of acceleration of gravity where, for example, the keyboard housing is substantially horizontal.

FIG. 26 also shows a diagram of the information handling system (IHS) 2600 that includes a display housing and a keyboard housing where a gravity related torque (Tg) is counteracted by a permanent magnet torque (Tpm) to stabilize a position of the display housing of the IHS 2600.

The method 2610 of FIG. 26 also includes a rotate block 2614 for, responsive to a signal, rotating the display housing with respect to the keyboard housing. In such an example, the rotate block 2614 can be performed at least in part by an electromagnetic mover (EM mover or EM-M).

FIG. 26 also shows a diagram of the IHS 2600 that includes the display housing and the keyboard housing where a net torque based on a gravity related torque (Tg) counteracted by a permanent magnet torque (Tpm) is overcome via generation of a EM mover torque ($T_{EM-M}$), which causes rotation of the display housing of the IHS 2600. While the EM mover torque is illustrated as being in a clockwise direction for clockwise rotation of the display housing, the EM mover may be utilized for rotation in a counterclockwise direction for counterclockwise rotation of the display housing.

Figure 27:
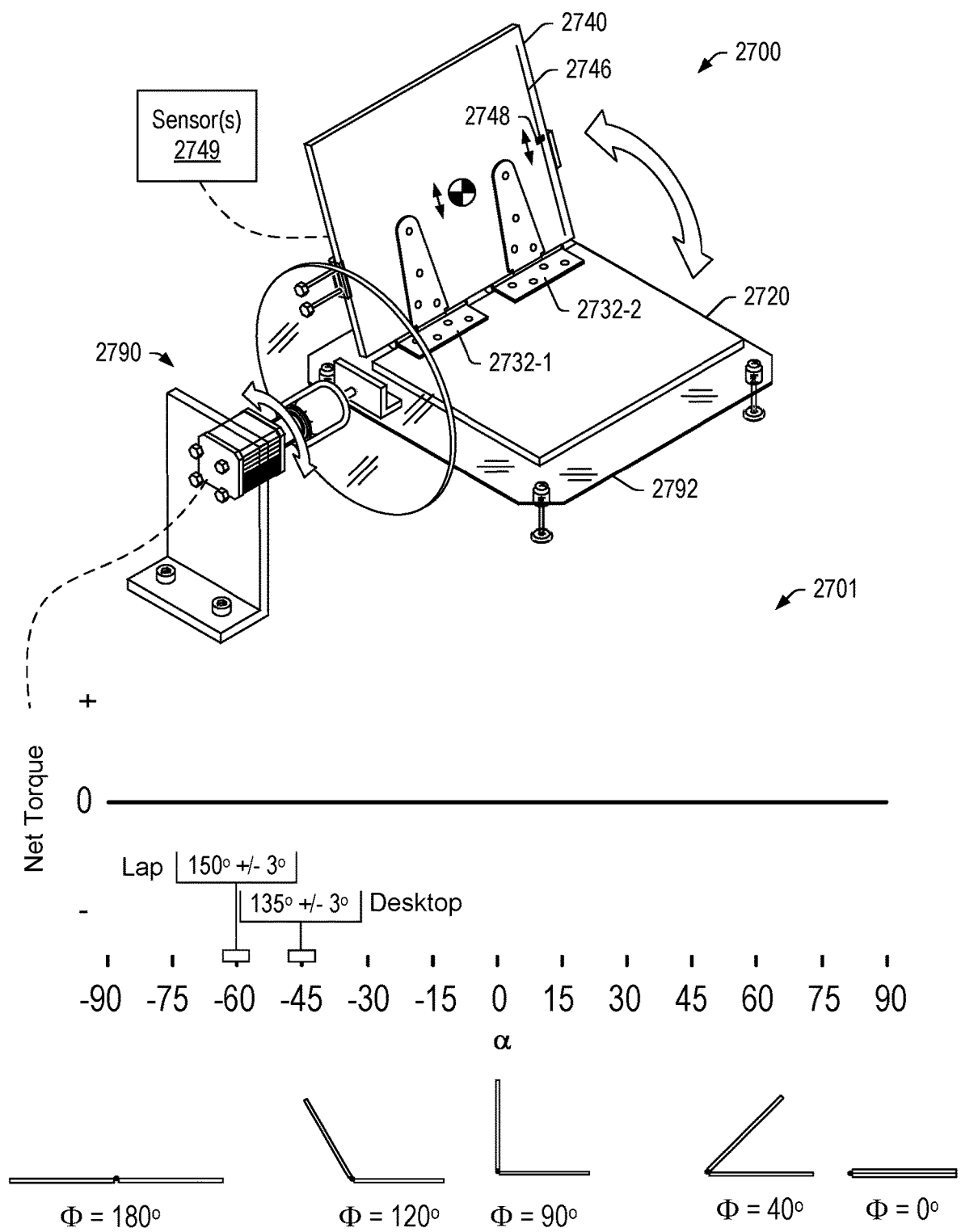
FIG. 27 is a diagram of an example of a system, an example of a measurement system and an example of a plot of net torque versus angle.

FIG. 27 shows an example of a system 2700 that includes a first housing 2720 that can include a processor and memory accessible to the processor; a second housing 2740 that includes a display operatively coupled to a processor (e.g., a processor of the first housing 2720 and/or a processor of the second housing 2740); and a hinge assembly 2732-1 and 2732-2 that rotatably couples the first housing 2720 and the second housing 2740, where the hinge assembly 2732-1 and 2732-2 includes permanent magnets that generate a first magnetic field and a second magnetic field orientable with respect to each other via rotation of the second housing 2740 with respect to the first housing 2720, where the first magnetic field and the second magnetic field include an aligned orientation, generate a clockwise restoring torque responsive to rotation in a first rotational direction from the aligned orientation, and generate a counterclockwise restoring torque responsive to rotation in a second, opposite rotational direction from the aligned orientation.

In the example of FIG. 27, the system 2700 can include one or more EM movers. For example, the hinge assembly 2732-1 and 2732-2 can include and/or be operatively coupled to an EM mover or EM movers. As explained, an EM mover may be a rotational EM mover and/or a translational EM mover.

In the example of FIG. 27, a measurement system 2790 is shown that can measure torque as the second housing 2740 is rotated with respect to the first housing 2720, which may be supported on a table 2792 of the measurement system 2790.

As an example, the measurement system 2790 may be operable as an EM mover. For example, consider energizing one or more coils of the measurement system 2790 such that it applies a torque, which may be sufficient to cause rotation of the second housing 2740 in a clockwise direction or a counterclockwise direction. As an example, the measurement system 2790 may be utilized to determine one or more characteristics of an EM mover or EM movers suitable for integration in the system 2700.

FIG. 27 shows an example plot 2701 of net torque versus angle $\alpha$ and angle $\Phi$ where the net torque is approximately 0 over a range of angles $-90$ degrees$\leq\alpha\leq+90$ degrees (0 degrees$\leq\Phi\leq 180$ degrees).

As an example, the system 2700 may be designed to provide a customized net torque response. Such a design can be part of a magnetic hinge assembly (e.g., fixed or adjustable), part of a friction hinge assembly (e.g., fixed or adjustable), part of a center of mass location (e.g., fixed or adjustable), etc. As an example, a center of mass location may be adjustable using a slider assembly that includes a groove 7446 and a movable mass 2748. For example, a user may move the movable mass 2748 in the groove 2746 toward the hinge assembly 2732-1 and 2732-2 to cause a gravity related torque to be less than a magnetic related torque or, for example, a user may move the movable mass 2748 in the groove 2746 away from the hinge assembly 2732-1 and 2732-2 to cause a gravity related torque to be greater than a magnetic related torque (e.g., a restoring torque).

As an example, where a user is utilizing the system 2700 on a horizontal desktop at an angle $\Phi$ of approximately 135 degrees, if the user desires transitioning the system 2700 to the orientation with $\Phi$ equal to 180 degrees, the movable mass 2748 may be moved away from the hinge assembly 2732-1 and 2732-2 such that the center of mass changes such that a gravity related torque is greater than a magnetic related torque and the second housing 2740 automatically moves. Similarly, if the user desires transitioning the system 2700 to the orientation with $\Phi$ equal to 90 degrees, the movable mass 2748 may be moved toward from the hinge assembly 2732-1 and 2732-2 such that the center of mass changes such that a gravity related torque is less than a magnetic related torque and the second housing 2740 automatically moves. In such an example, the user may tip the second housing 2740 to an angle less than 90 degrees while also moving the movable mass 2748 away from the hinge assembly 2732-1 and 2732-2 such that the second housing 2740 automatically moves to the orientation with $\Phi$ equal to 0 degrees.

As an example, EM mover circuitry may be tailored using one or more measurements acquired by the measurement system 2790. For example, consider a schedule that can specify a relationship between angle and power (e.g., current, etc.). As an example, EM mover circuitry may utilize a pulse-width modulation (PWM) approach for control of an EM mover or EM movers.

FIG. 27 also shows the system 2700 as including one or more sensors 2749. For example, the system 2700 can include an integral torque sensor such as that of the measurement system 2790 and/or the system 2700 can include one or more position and/or motion sensors. As to an integral torque sensor, it may be utilized to measure torque and cause issuance of a signal (e.g., an instruction, a command, a sound, a graphic, a light, etc.) where the signal may be utilized for one or more purposes. For example, consider a signal to guide a user in making an adjustment to a center of mass such as by moving the movable mass 2748 to a desired position to achieve a desired torque, which may be a net torque of approximately zero. As another example, a signal can be utilized as part of an EM mover approach to making an adjustment to a housing such as the display housing 2740. For example, consider EM mover circuitry that provides a feedback loop where torque can be generated in a manner that depends on a torque measurement or torque determination.

As to a position and/or motion sensor, consider one or more of a gravity sensor, an accelerometer, a gyroscope, a level sensor, a distance sensor, and a rotational position sensor. In such an example, a measurement may indicate a direction of gravity with respect to a system or a portion of a system. As illustrated, the angle formed by the direction of gravity with respect to a display housing depends on a rotational position of the display housing. Where a display housing includes a sensor that can measure the direction of gravity, the angle of the display housing may be determined. As an example, a keyboard housing may include such a sensor where measurements from a display housing sensor and a keyboard housing sensor can be utilized to determine an open angle (e.g., a value of the angle $\Phi$) of the display housing with respect to the keyboard housing. In such an example, a signal may be issued that indicates how an adjustment may be made, for example, to a movable mass that can alter a center of mass of a display housing for achieving a desired balance of torque (e.g., to achieve a net torque of approximately zero).

As mentioned, a sensor or sensors can provide for enabling or disabling EM mover circuitry. As mentioned, a sensor or sensors can provide for controlling an EM mover or EM movers (e.g., to generate a desirable amount of torque, to terminate torque generation, and/or to move a housing to a particular angle, where the angle may be with respect to gravity or another housing, etc.). As an example, a sensor or sensors may provide for controlling a rotational speed. For example, consider a "soft close" mode of operation where as a display housing approaches a keyboard housing during closing, speed of closing may slow down such that momentum, contact, etc., occurs in a desirable manner, which may aim to increase lifetime of equipment.

As an example, a sensor or sensors may be utilized for purposes of stopping rotation of a housing. For example, a user may position a finger in space as a stopping point where when the housing contacts the finger through rotation of the housing, EM mover circuitry can issue a signal that causes a reduction in torque generation such that the housing stops. In such an example, stopping may occur responsive to an EM mover experiencing increased resistance to rotation of a shaft and/or translation of a shaft, stopping may occur responsive to sensing of an relatively abrupt change in movement and/or stopping may occur responsive to sensing of contact with the finger in space (e.g., via one or more touch sensitive surfaces).

As an example, a system may provide feedback that can be interpreted by a user such that the user can make one or more adjustments to the system, which may be an adjustment to a display housing, an adjustment to a keyboard housing (e.g., adjusting with respect to gravity, etc.), or an adjustment to the system that adjusts both the display housing and the keyboard housing. For example, consider feedback rendered to a display of the display housing that instructs a user to "level" the keyboard housing to make it substantially horizontal or to dispose it at an angle other than horizontal, which may depend on a position of a center of mass of a display housing. As an example, feedback can include measuring or detecting a position of a center of mass, which may include providing a sensor coupled to a movable mass or acquiring torque measurements for two different positions of a display housing or measuring movement of a display housing due in part to an offset between a gravity torque and a restoring torque, etc. As explained, one or more sensors may be utilized to provide a signal or signals, which may provide for feedback such that a user and/or the system itself may make one or more adjustments to the system, for example, as to torque or torques.

Figure 28:
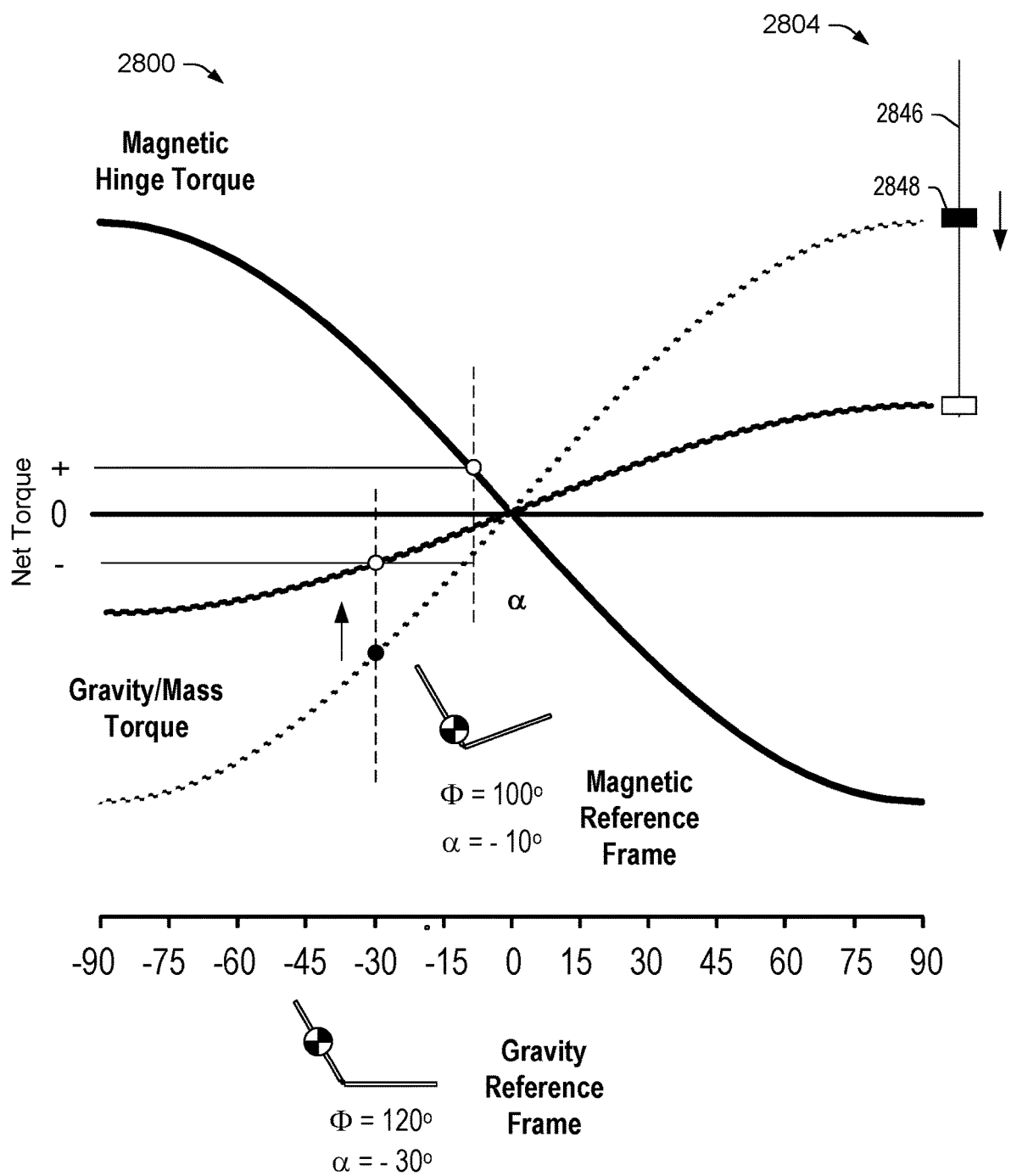
FIG. 28 is a diagram of an example of a plot of net torque versus angle and an example of a center of mass adjustment assembly.

FIG. 28 shows an example plot 2800 with an example of a center of mass adjustment assembly 2804 for a housing that can include a guide 2846 and a movable mass 2848. As an example, the movable mass 2848 can be a fraction of a total mass of a housing that can be adjustably moved away from a hinge assembly or toward a hinge assembly (see, e.g., FIG. 7), for example, to adjust at least a portion of a gravity related torque curve (see, e.g., FIG. 8). The plot 2800 shows a magnetic reference frame and a gravity reference frame for a system where magnets can be aligned at angles shown in the magnetic reference frame while a gravity force (e.g., F=mg) applies to a display housing of the system in the gravity reference frame. The magnetic reference frame may correspond to a user placing the system on her legs at an angle that differs from horizontal. In another example, a user may place the system on a desktop that has an angle that differs from horizontal (e.g., $\alpha=+10°$). Such displacements can result in a mismatch between magnetic hinge torque (e.g., restoring torque) and gravity torque. In the example of FIG. 28, the movable mass 2848 may be moved (e.g., manually, semi-automatically, or automatically) to effectively shorten the lever arm by moving the center of mass of the display housing toward a hinge assembly of the system. In such an example, there can be a compensation for the 20 degree difference between the reference frames such that a net torque of zero is established. With a net torque of zero, the display housing of the system can be maintained in a stable state as illustrated in the magnetic reference frame. As explained, measurements from one or more sensors may be utilized as part of a method for achieving or maintaining a stable state.

As explained with respect to the method 2510 of FIG. 25, EM mover circuitry may be enabled and/or disabled using information from one or more sensors. As an example, where a movable mass is included in a system, a position of such a mass may be utilized to adjust a range or ranges of angles where EM mover operation is suitable and/or may be utilized to adjust one or more operational parameters of an EM mover or EM movers.

As an example, a system can include a housing; a hinge assembly operatively coupled to the housing for rotation of the housing about a hinge axis, where the hinge assembly includes permanent magnets that generate a first magnetic field and a second magnetic field orientable with respect to each other via rotation of the housing, where the first magnetic field and the second magnetic field include an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation; and an electromagnetic mover operatively coupled to the housing for rotation of the housing about the hinge axis. In such an example, the housing can include a display or, as an example, the housing can include one or more solar cells.

As an example, a system can include a base, where a hinge assembly is operatively coupled to the base and where the hinge assembly is operatively coupled to a housing. In such an example, the base can include a keyboard.

As an example, a system can include a turntable, where a housing rotates about an axis of the turntable. For example, consider a housing that includes one or more solar cells where rotation via the turntable rotates the housing to orient the one or more solar cells with respect to the sun.

As an example, an electromagnetic mover can be or include an electric motor. Such an electric motor can include, for example, a stator and a rotor where the rotor includes or is operatively coupled to a shaft that can be rotatable. In such an example, the shaft may be an axle of a hinge assembly or may be operatively coupled to an axle of a hinge assembly. As an example, such a shaft may be operatively coupled to a barrel of a hinge assembly.

As an example, an electromagnetic mover can be or include an electric stepper motor. As an example, an electric stepper motor can be actuated using electricity to cause a rotor of the electric stepper motor to rotate with respect to a stator of the electric stepper motor.

As an example, a system can include audio circuitry, where an electromagnetic mover is operatively coupled to the audio circuitry. In such an example, the audio circuitry can include a microphone input where the electromagnetic mover can be actuatable responsive to receipt of signals via the microphone input (e.g., via a diaphragm microphone, etc.).

As an example, a system can include touch-sensitive circuitry, where an electromagnetic mover is operatively coupled to the touch-sensitive circuitry. In such an example, the electromagnetic mover can be actuatable responsive to receipt of signals via the touch-sensitive circuitry.

As an example, a system can include a processor, memory, and operating system instructions stored in the memory and executable by the processor to establish an operating system environment. In such an example, an electromagnetic mover can be actuatable responsive to a change in a state of the operating system environment. For example, consider a change in the state that is a transition to a lower power state (e.g., consider power states of a clamshell computing system, etc.).

As an example, a system can include a clock, where an electromagnetic mover can be actuatable responsive to a clock signal of the clock.

As an example, a system can include a movable mass operatively coupled to an electromagnetic mover. In such an example, a housing can include an adjustable center of mass adjustable via movement of the movable mass (e.g., via actuation of the EM mover, etc.).

As an example, a system can include at least one battery operatively coupled to an electromagnetic mover.

As an example, a system can include security circuitry operatively coupled to an electromagnetic mover. For example, consider trusted platform module (TPM) as a type of security circuitry that can issue a signal responsive to an authentication process where the signal instructs an EM mover to transition a clamshell computing system from a closed state to an open state.

As an example, a method can include, in a system that includes a housing, a hinge assembly operatively coupled to the housing, where the hinge assembly includes permanent magnets that generate a first magnetic field and a second magnetic field orientable with respect to each other via rotation of the housing, where the first magnetic field and the second magnetic field include an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation, and an electromagnetic mover operatively coupled to the housing for rotation of the panel, actuating the electromagnetic mover responsive to a signal to rotate the housing about an axis of the hinge assembly. In such an example, the signal may cause the housing to rotate from one state to another state. For example, where the system is a clamshell computing system, it may rotate from a closed state to an open state or vice versa.

As an example, where a housing includes one or more solar cells, a signal may cause a housing to rotate to become more aligned with the sun.

As an example, a signal can be one or more of a voice signal, an operating system signal, a touch signal, a clock signal, an application signal, a wireless signal, a power generation optimization signal (e.g., for power generated by one or more solar cells), etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 29:
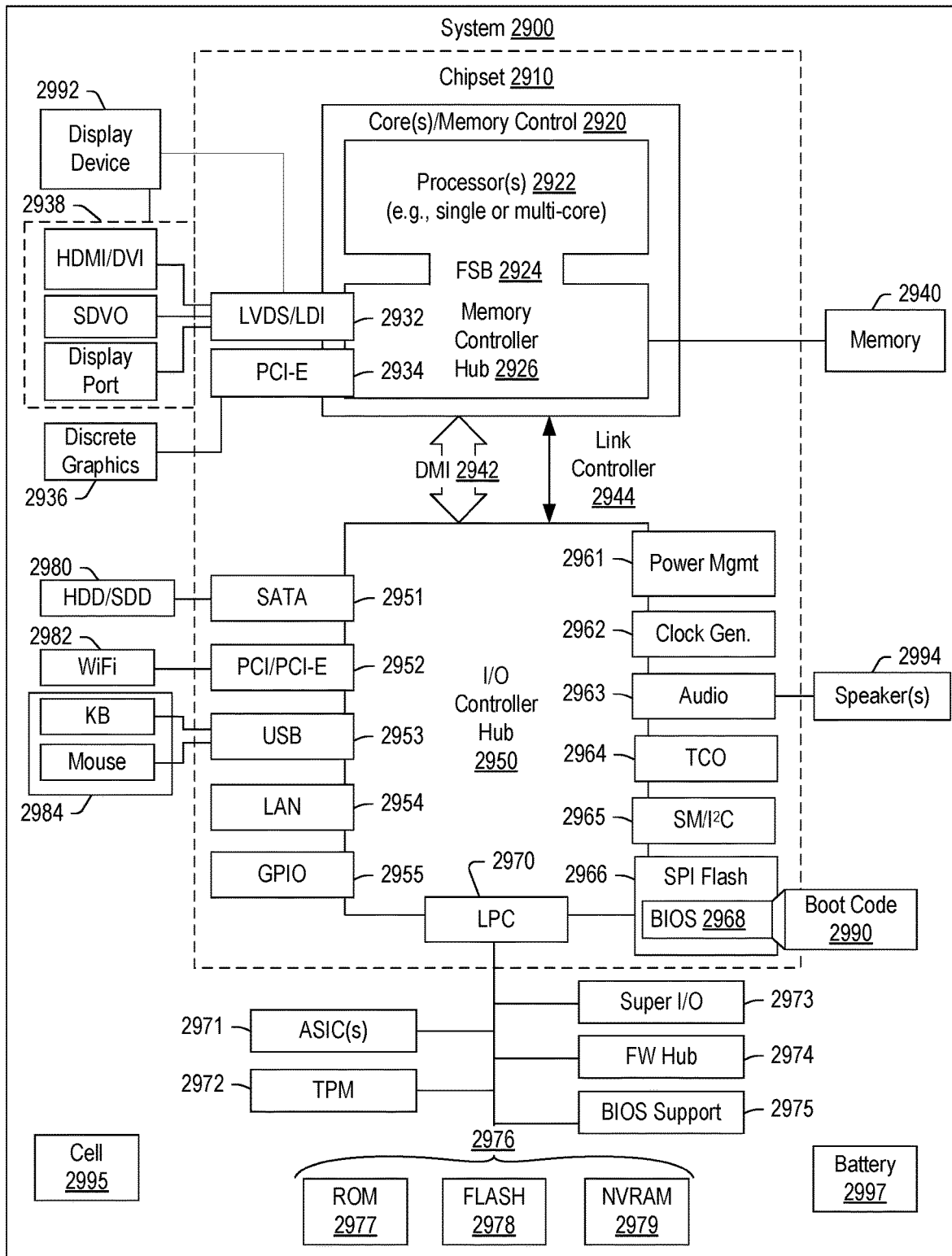
FIG. 29 is a diagram of an example of a system that includes one or more processors.

While various examples of circuits or circuitry have been discussed, FIG. 29 depicts a block diagram of an illustrative computer system 2900. The system 2900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 2900. As an example, a system such as the system 100 of FIG. 1 may include at least some of the features of the system 2900.

As shown in FIG. 29, the system 2900 includes a so-called chipset 2910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 29, the chipset 2910 has a particular architecture, which may vary to some extent depending on brand or manufacturer. The architecture of the chipset 2910 includes a core and memory control group 2920 and an I/O controller hub 2950 that exchange information (e.g., data, signals, commands, etc.) via, for example, a direct management interface or direct media interface (DMI) 2942 or a link controller 2944. In the example of FIG. 29, the DMI 2942 is a chip-to-chip interface (sometimes referred to as being a link between a "northbridge" and a "southbridge").

The core and memory control group 2920 include one or more processors 2922 (e.g., single core or multi-core) and a memory controller hub 2926 that exchange information via a front side bus (FSB) 2924. As described herein, various components of the core and memory control group 2920 may be integrated onto a single processor die, for example, to make a chip that supplants the conventional "northbridge" style architecture.

The memory controller hub 2926 interfaces with memory 2940. For example, the memory controller hub 2926 may provide support for DDR SDRAM memory (e.g., DDR, DDR2, DDR3, etc.). In general, the memory 2940 is a type of random-access memory (RAM). It is often referred to as "system memory".

The memory controller hub 2926 further includes a low-voltage differential signaling interface (LVDS) 2932. The LVDS 2932 may be a so-called LVDS Display Interface (LDI) for support of a display device 2992 (e.g., a CRT, a flat panel, a projector, etc.). A block 2938 includes some examples of technologies that may be supported via the LVDS interface 2932 (e.g., serial digital video, HDMI/DVI, display port). The memory controller hub 2926 also includes one or more PCI-express interfaces (PCI-E) 2934, for example, for support of discrete graphics 2936. Discrete graphics using a PCI-E interface has become an alternative approach to an accelerated graphics port (AGP). For example, the memory controller hub 2926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2950 includes a variety of interfaces. The example of FIG. 29 includes a SATA interface 2951, one or more PCI-E interfaces 2952 (optionally one or more legacy PCI interfaces), one or more USB interfaces 2953, a LAN interface 2954 (more generally a network interface), a general purpose I/O interface (GPIO) 2955, a low-pin count (LPC) interface 2970, a power management interface 2961, a clock generator interface 2962, an audio interface 2963 (e.g., for speakers 2994), a total cost of operation (TCO) interface 2964, a system management bus interface (e.g., a multi-master serial computer bus interface) 2965, and a serial peripheral flash memory/controller interface (SPI Flash) 2966, which, in the example of FIG. 29, includes BIOS 2968 and boot code 2990. With respect to network connections, the I/O hub controller 2950 may include integrated gigabit Ethernet controller lines multiplexed with a PCI-E interface port. Other network features may operate independent of a PCI-E interface.

The interfaces of the I/O hub controller 2950 provide for communication with various devices, networks, etc. For example, the SATA interface 2951 provides for reading, writing or reading and writing information on one or more drives 2980 such as HDDs, SDDs or a combination thereof. The I/O hub controller 2950 may also include an advanced host controller interface (AHCI) to support one or more drives 2980. The PCI-E interface 2952 allows for wireless connections 2982 to devices, networks, etc. The USB interface 2953 provides for input devices 2984 such as keyboards (KB), one or more optical sensors, mice and various other devices (e.g., microphones, cameras, phones, storage, media players, etc.). On or more other types of sensors may optionally rely on the USB interface 2953 or another interface (e.g., I²C, etc.). As to microphones, the system 2900 of FIG. 29 may include hardware (e.g., audio card) appropriately configured for receipt of sound (e.g., user voice, ambient sound, etc.).

In the example of FIG. 29, the LPC interface 2970 provides for use of one or more ASICs 2971, a trusted platform module (TPM) 2972, a super I/O 2973, a firmware hub 2974, BIOS support 2975 as well as various types of memory 2976 such as ROM 2977, Flash 2978, and non-volatile RAM (NVRAM) 2979. With respect to the TPM 2972, this module may be in the form of a chip that can be used to authenticate software and hardware devices. For example, a TPM may be capable of performing platform authentication and may be used to verify that a system seeking access is the expected system.

The system 2900, upon power on, may be configured to execute boot code 2990 for the BIOS 2968, as stored within the SPI Flash 2966, and thereafter processes data under the control of one or more operating systems and application software (e.g., stored in system memory 2940). An operating system may be stored in any of a variety of locations and accessed, for example, according to instructions of the BIOS 2968. Again, as described herein, a satellite, a base, a server or other machine may include fewer or more features than shown in the system 2900 of FIG. 29. Further, the system 2900 of FIG. 29 is shown as optionally include cell phone circuitry 2995, which may include GSM, CDMA, etc., types of circuitry configured for coordinated operation with one or more of the other features of the system 2900. Also shown in FIG. 29 is battery circuitry 2997, which may provide one or more battery, power, etc., associated features (e.g., optionally to instruct one or more other components of the system 2900). As an example, a SMBus may be operable via a LPC (see, e.g., the LPC interface 2970), via an I²C interface (see, e.g., the SM/I²C interface 2965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a housing;
   a hinge assembly operatively coupled to the housing for rotation of the housing about a hinge axis, wherein the hinge assembly comprises permanent magnets that generate a first magnetic field and a second magnetic field orientable with respect to each other via rotation of the housing, wherein the first magnetic field and the second magnetic field comprise an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation; and
   an electromagnetic mover operatively coupled to the housing for rotation of the housing about the hinge axis.

2. The system of claim 1, wherein the housing comprises a display.

3. The system of claim 1, wherein the housing comprises solar cells.

4. The system of claim 1, comprising a base, wherein the hinge assembly is operatively coupled to the base.

5. The system of claim 4, wherein the base comprises a keyboard.

6. The system of claim 1, comprising a turntable, wherein the housing rotates about an axis of the turntable.

7. The system of claim 1, wherein the electromagnetic mover comprises an electric motor.

8. The system of claim 1, wherein the electromagnetic mover comprises an electric stepper motor.

9. The system of claim 1, comprising audio circuitry, wherein the electromagnetic mover is operatively coupled to the audio circuitry.

10. The system of claim 9, wherein the audio circuitry comprises a microphone input and wherein the electromagnetic mover is actuatable responsive to receipt of signals via the microphone input.

11. The system of claim 1, comprising touch-sensitive circuitry, wherein the electromagnetic mover is operatively coupled to the touch-sensitive circuitry and wherein the electromagnetic mover is actuatable responsive to receipt of signals via the touch-sensitive circuitry.

12. The system of claim 1, comprising a processor, memory, and operating system instructions stored in the memory and executable by the processor to establish an operating system environment.

13. The system of claim 12, wherein the electromagnetic mover is actuatable responsive to a change in a state of the operating system environment.

14. The system of claim 13, wherein the change in the state comprises a transition to a lower power state.

15. The system of claim 1, comprising a clock, wherein the electromagnetic mover is actuatable responsive to a clock signal of the clock.

16. The system of claim 1, comprising a movable mass operatively coupled to the electromagnetic mover.

17. The system of claim 16, wherein the housing comprises an adjustable center of mass adjustable via movement of the movable mass.

18. The system of claim 1, comprising at least one battery operatively coupled to the electromagnetic mover.

19. The system of claim 1, comprising security circuitry operatively coupled to the electromagnetic mover.

20. A method comprising:
   in a system that comprises a housing, a hinge assembly operatively coupled to the housing, wherein the hinge assembly comprises permanent magnets that generate a first magnetic field and a second magnetic field orientable with respect to each other via rotation of the housing, wherein the first magnetic field and the second magnetic field comprise an aligned orientation, generate a clockwise restoring torque responsive to rotation of the housing in a first rotational direction from the aligned orientation, and generate a counterclockwise restoring torque responsive to rotation of the housing in a second, opposite rotational direction from the aligned orientation, and an electromagnetic mover operatively coupled to the housing for rotation of the panel, actuating the electromagnetic mover responsive to a signal to rotate the housing about an axis of the hinge assembly.

* * * * *